(12) United States Patent
Cadambi et al.

(10) Patent No.: US 9,152,467 B2
(45) Date of Patent: Oct. 6, 2015

(54) METHOD FOR SIMULTANEOUS SCHEDULING OF PROCESSES AND OFFLOADING COMPUTATION ON MANY-CORE COPROCESSORS

(71) Applicant: NEC Laboratories America, Inc., Princeton, NJ (US)

(72) Inventors: Srihari Cadambi, Princeton Junction, NJ (US); Kunal Rao, Princeton, NJ (US); Srimat T. Chakradhar, Manalapan, NJ (US); Rajat Phull, Monmouth Junction, NJ (US); Giuseppe Coviello, Plainsboro, NJ (US); Murugan Sankaradass, Dayton, NJ (US); Cheng-Hong Li, New Brunswick, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 279 days.

(21) Appl. No.: 13/858,039

(22) Filed: Apr. 6, 2013

(65) Prior Publication Data
US 2014/0208327 A1    Jul. 24, 2014

Related U.S. Application Data

(60) Provisional application No. 61/754,371, filed on Jan. 18, 2013, provisional application No. 61/761,985, filed on Feb. 7, 2013, provisional application No. 61/761,969, filed on Feb. 7, 2013.

(51) Int. Cl.
*G06F 9/46* (2006.01)
*G06F 9/50* (2006.01)

(52) U.S. Cl.
CPC ............ *G06F 9/5044* (2013.01); *G06F 9/5033* (2013.01); *G06F 2209/509* (2013.01)

(58) Field of Classification Search
None
See application file for complete search history.

(56) References Cited

U.S. PATENT DOCUMENTS

| | | | | |
|---|---|---|---|---|
| 5,826,081 A * | 10/1998 | Zolnowsky | ................... | 718/103 |
| 6,385,638 B1 * | 5/2002 | Baker-Harvey | ............... | 718/107 |
| 7,369,500 B1 * | 5/2008 | Gallagher et al. | ............. | 370/235 |
| 8,005,978 B1 * | 8/2011 | Duffie et al. | ................... | 709/235 |
| 8,024,395 B1 * | 9/2011 | Odom | ........................... | 709/201 |
| 8,429,656 B1 * | 4/2013 | Duluk et al. | ................... | 718/102 |
| 8,484,279 B1 * | 7/2013 | Cole | ............................ | 709/201 |

(Continued)

*Primary Examiner* — Emerson Puente
*Assistant Examiner* — Mehran Kamran
(74) *Attorney, Agent, or Firm* — Joseph Kolodka

(57) ABSTRACT

A method is disclosed to manage a multi-processor system with one or more manycore devices, by managing real-time bag-of-tasks applications for a cluster, wherein each task runs on a single server node, and uses the offload programming model, and wherein each task has a deadline and three specific resource requirements: total processing time, a certain number of manycore devices and peak memory on each device; when a new task arrives, querying each node scheduler to determine which node can best accept the task and each node scheduler responds with an estimated completion time and a confidence level, wherein the node schedulers use an urgency-based heuristic to schedule each task and its offloads; responding to an accept/reject query phase, wherein the cluster scheduler send the task requirements to each node and queries if the node can accept the task with an estimated completion time and confidence level; and scheduling tasks and offloads using a aging and urgency-based heuristic, wherein the aging guarantees fairness, and the urgency prioritizes tasks and offloads so that maximal deadlines are met.

14 Claims, 15 Drawing Sheets

(56) References Cited

U.S. PATENT DOCUMENTS

| | | | |
|---|---|---|---|
| 8,539,499 B1* | 9/2013 | Tovpeko et al. | 718/104 |
| 2002/0073226 A1* | 6/2002 | Sridhar et al. | 709/235 |
| 2002/0087827 A1* | 7/2002 | Stark et al. | 712/22 |
| 2003/0009621 A1* | 1/2003 | Gruner et al. | 711/118 |
| 2004/0019891 A1* | 1/2004 | Koenen | 718/102 |
| 2004/0187120 A1* | 9/2004 | Moore et al. | 718/100 |
| 2004/0194061 A1* | 9/2004 | Fujino | 717/120 |
| 2004/0268354 A1* | 12/2004 | Kanai et al. | 718/100 |
| 2004/0268355 A1* | 12/2004 | Robin et al. | 718/100 |
| 2005/0132252 A1* | 6/2005 | Fifer et al. | 714/15 |
| 2005/0283786 A1* | 12/2005 | Dettinger et al. | 718/104 |
| 2006/0167966 A1* | 7/2006 | Kumar et al. | 709/201 |
| 2006/0218551 A1* | 9/2006 | Berstis et al. | 718/102 |
| 2006/0259799 A1* | 11/2006 | Melpignano et al. | 713/300 |
| 2007/0011683 A1* | 1/2007 | Helander | 718/104 |
| 2008/0021987 A1* | 1/2008 | Bates et al. | 709/223 |
| 2008/0046895 A1* | 2/2008 | Dillenberger et al. | 718/105 |
| 2008/0126486 A1* | 5/2008 | Heist et al. | 709/205 |
| 2008/0195843 A1* | 8/2008 | Muniandy | 712/31 |
| 2008/0244227 A1* | 10/2008 | Gee et al. | 712/30 |
| 2008/0263324 A1* | 10/2008 | Sutardja et al. | 712/43 |
| 2009/0055829 A1* | 2/2009 | Gibson | 718/103 |
| 2010/0088703 A1* | 4/2010 | Whitfield et al. | 718/101 |
| 2010/0292980 A1* | 11/2010 | Andrade et al. | 703/22 |
| 2011/0023040 A1* | 1/2011 | Hendry et al. | 718/102 |
| 2011/0119469 A1* | 5/2011 | Ohmacht | 712/216 |
| 2011/0239220 A1* | 9/2011 | Gibson et al. | 718/103 |
| 2011/0302372 A1* | 12/2011 | Fontenot et al. | 711/122 |
| 2012/0054756 A1* | 3/2012 | Arnold et al. | 718/102 |
| 2012/0054771 A1* | 3/2012 | Krishnamurthy et al. | 718/105 |
| 2012/0110582 A1* | 5/2012 | Ferdous et al. | 718/101 |
| 2012/0117298 A1* | 5/2012 | Scannell et al. | 711/6 |
| 2012/0131591 A1* | 5/2012 | Moorthi et al. | 718/104 |
| 2012/0158967 A1* | 6/2012 | Sedayao et al. | 709/226 |
| 2012/0204008 A1* | 8/2012 | Dockser et al. | 712/208 |
| 2013/0205141 A1* | 8/2013 | Solihin | 713/300 |
| 2013/0239112 A1* | 9/2013 | Kato et al. | 718/1 |
| 2013/0346987 A1* | 12/2013 | Raney et al. | 718/102 |
| 2014/0108656 A1* | 4/2014 | Salinca et al. | 709/226 |

* cited by examiner

```
while (new event) {
    if (there is a process to be scheduled) {
        /* Process scheduler: schedule a process from Process List */
        schedule(Process List,
                 fit(Memory Resource Limit),
                 urgency(priority, age, arrival time, credit, QoS));
    }
    for each Manycore Coprocessor {
        if (there is an offload to be scheduled) {
            /* Offload scheduler: schedule an offload from Offload List */
            schedule(Offload List,
                     fit(Thread Resource Limit),
                     urgency(priority, age, arrival time, credit, QoS));
        }
    }
    for each Completed Offload
        adjustCredits(owning process, actual execution time, QoS);
}
```

FIG. 5A

METHOD FOR SIMULTANEOUS SCHEDULING OF PROCESSES AND OFFLOADING COMPUTATION ON MANY-CORE COPROCESSORS

This application is a non-provisional of and claims priority to provisional applications with Ser. No. 61/754,371 filed on Jan. 18, 2013 and Ser. Nos. 61/761,969 and 61/761,985 both filed on Feb. 7, 2013, the contents of which are incorporated by reference.

BACKGROUND

The present application relates to multi-core processing.

Intel's newest manycore processor, the Xeon Phi, is a PCIe device with more than 50 cores supporting more than 200 hardware threads. Unlike the GPU and other manycores, several design choices make the Xeon Phi easier to program. First, its cores are x86 compatible. Second, it runs the Linux operating system, enabling easy multiprocessing with services such as virtual memory and context switching. Third, it supports OpenMP, a popular parallel programming model. Intel also provides middleware to manage data transfers between the host and coprocessor. Consequently, the Xeon Phi is widely perceived to be more usable across a range of parallel applications, especially when compared to other manycore offerings in the recent past.

Many suitable applications for the Xeon Phi can be expressed using a bag-of-tasks framework. Bag-of-tasks applications are those whose tasks are completely independent. Although conceptually simple, this framework is typical of a large class of problems such as satellite imaging, BOINC-like computations (SETI@home), image processing, networking and several others. Tasks belonging to bag-of-tasks applications typically have real-time constraints, which we refer to as the task deadline. For instance, a satellite may produce a certain amount of data periodically, say once each revolution; in order to avoid backlog, the system must complete processing the data before the satellite comes around again and dumps the next round of data. Therefore, in the bag-of-task application scenarios, a key requirement is to complete the processing of a task before its deadline.

SUMMARY

In a first aspect, a method for scheduling workload in a system with one or more manycore coprocessors includes receiving requests from processes or offloads to the coprocessors, each process or offload requesting a predetermined quality of service (QoS) including a request for memory and threads for a specified duration; determining a fit function, which determines the eligibility of a process or offload if one of the coprocessors has sufficient memory to satisfy a process' QoS and sufficient memory and threads to satisfy an offload's QoS; determining an urgency function based on the process or offload's priority, age, waiting time, QoS and credits; and selecting a process from a process list and an offload from an offload list based on the fit function and the urgency function.

In another aspect, a scheduler for managing real-time bag-of-tasks applications (applications whose tasks are independent) is disclosed for a heterogeneous cluster whose server nodes contain one or more manycore coprocessors. Each task runs on a single server node, and uses the offload programming model, i.e., they run on the host processor and offload subtasks to the coprocessor. A task has a deadline and three specific resource requirements: total processing time, a certain number of manycore devices and peak memory on each device. The goal of the scheduler is to provide each task its resource requirements while meeting as many deadlines as possible.

In yet another aspect, a scheduler has a cluster component and a server node component that collectively provide the following operations. First, when a new task arrives, the cluster scheduler queries each node scheduler to figure which node can best accept the task. Each node scheduler responds with an estimated completion time were it to accept the task, along with a confidence level. Second, the node schedulers use an urgency-based heuristic to schedule each task and its offloads. The heuristic uses deadlines as well as predicted estimates of the number of future offloads and their execution times. Third, the scheduler uses a credit-based system to relax the accuracy with which users have to specify processing times. Credits allow the system to amortizing task overruns across the tasks of a user. The node scheduler's estimators also allow the cluster scheduler to quickly refuse infeasible tasks. This not only prevents users from flooding the system, but also helps by suggesting better deadlines for resubmitting rejected tasks.

In another aspect, a scheduler uses an Accept/Reject Query Phase. When a task with a deadline and resource requirements arrives at the cluster, the cluster scheduler send the task requirements to each node and queries if the node can accept the task. Nodes reject tasks if they do not have sufficient resources, but otherwise indicate they can accept the task with an estimated completion time and confidence level. The cluster scheduler then issues the task to a suitable node, or rejects the task if resources are insufficient or if it cannot complete the task within its deadline due to system load. When tasks are rejected due to system load, the framework provides the user with a more feasible deadline for possible resubmission.

In a further aspect, a scheduler uses Urgency-based Scheduling. The node-level scheduler schedules tasks and their offloads using a novel aging and urgency-based heuristic. Aging guarantees fairness, while urgency, which depends on deadlines and processing times, attempts to prioritize tasks and offloads so that maximal deadlines are met. Given a task deadline and processing time, the scheduler uses simple methods to estimate deadlines and processing times of sub-tasks offloaded to the coprocessor such as the Xeon Phi. It allows different tasks and their offloads to coexist on a Xeon Phi device while providing performance isolation and resource guarantees.

In a further aspect, a scheduler uses credits. The node-level scheduler uses a system of credits to relax the accuracy with which a user has to specify task processing times. A user accumulates credits if his or her tasks complete and free up resources faster than their requested processing times. Otherwise if tasks overrun their processing times, the user loses credits. A user can use credits gained from a fast task to offset a slow task. This allows some leeway in the specification of task processing times, which are often data dependent and not easy to specify accurately. Credits also help shift focus from the task-level to the user-level: the important thing is not how well every single task adheres to its processing times, but rather how well a group of tasks belonging to a user together adhere to their collective processing time estimates.

Implementations of the above system can include one or more of the following. The method includes:
  Simultaneous scheduling of processes and offloads
  Assigning credits to a process based on how well its offloads adhere to the requested time (QoS) on their resources
  Using credits to prioritize a process Using credits against a user's account Assigning an urgency to a process an offload, where the urgency is a function of the process' or offload's age, priority, arrival time, credits and QoS Using urgency to prioritize a process or offload Aging a process and its offload Blocking scheduling depending on age Allowing controlled memory and thread oversubscription using a configuration parameter Assign a QoS requirement and a priority to every process and offload. The QoS requirement consists of (i) a resource (memory and thread) request for a specified duration and (ii) a limit on the overall waiting time.

One implementation handles the Accept/Reject Query Phase: When a task with a deadline and resource requirements arrives at the cluster, the cluster scheduler send the task requirements to each node and queries if the node can accept the task. Nodes reject tasks if they do not have sufficient resources, but otherwise indicate they can accept the task with an estimated completion time and confidence level. The cluster scheduler then issues the task to a suitable node, or rejects the task if resources are insufficient or if it cannot complete the task within its deadline due to system load. When tasks are rejected due to system load, the framework provides the user with a more feasible deadline for possible resubmission.

Another implementation handles the Urgency-based Scheduling: The node-level scheduler schedules tasks and their offloads using a novel aging and urgency-based heuristic. Aging guarantees fairness, while urgency, which depends on deadlines and processing times, attempts to prioritize tasks and offloads so that maximal deadlines are met. Given a task deadline and processing time, the scheduler uses simple methods to estimate deadlines and processing times of subtasks offloaded to the Xeon Phi. It allows different tasks and their offloads to coexist on a Xeon Phi device while providing performance isolation and resource guarantees.

Yet another implementation handles Credits: The node-level scheduler uses a system of credits to relax the accuracy with which a user has to specify task processing times. A user accumulates credits if his or her tasks complete and free up resources faster than their requested processing times. Otherwise if tasks overrun their processing times, the user loses credits. A user can use credits gained from a fast task to offset a slow task. This allows some leeway in the specification of task processing times, which are often data dependent and not easy to specify accurately. Credits also help shift focus from the task-level to the user-level: the important thing is not how well every single task adheres to its processing times, but rather how well a group of tasks belonging to a user together adhere to their collective processing time estimates.

In yet another aspect, a method is disclosed to manage a multi-processor system with one or more multiple-core coprocessors by intercepting coprocessor offload infrastructure application program interface (API) calls; scheduling user processes to run on one of the coprocessors; scheduling offloads within user processes to run on one of the coprocessors; and affinitizing offloads to predetermined cores within one of the coprocessors by selecting and allocating cores to an offload, and obtaining a thread-to-mapping from a user.

In a further aspect, a server populated with multiple core coprocessor includes a manager to control user processes containing offload blocks by intercepting COI API calls and schedules user processes to run on one of the Xeon Phi coprocessors; schedules offloads within user processes to run on one of the Xeon Phi coprocessors; and affinitizes offloads to specific cores within one of the Xeon Phi coprocessors by selecting and allocating cores to an offload, and obtaining the thread-to-mapping from the user.

Advantages of the above scheduler system may include one or more of the following. The scheduling framework allows the system with the manycore coprocessors to:

Minimize the number of tasks that miss deadlines;

Prevent users from flooding the system by detecting and rejecting infeasible tasks, while suggesting a more feasible deadline for such tasks;

Ensure fairness so that all tasks as well as their Xeon Phi subtasks are guaranteed to be scheduled;

Provide resource guarantees by allowing tasks access to their requested resources under performance isolation;

Allow users some flexibility and leeway in accuracy of specified processing times;

Maximize core utilization by sharing each device across several tasks and their offloads.

When multiple processes share a coprocessor by offloading to the system, the result is faster operation and better reliability by (i) lowering waiting times for processes and offloads, (ii) avoiding thread oversubscription and executing faster, (iii) utilizing the cores better, (iv) avoiding memory oversubscription and unexpected process terminations and (v) ensuring equitable and fair resource distribution across all processes. The scheduler can simultaneously schedule processes and their offloaded computations on many-core processes. As part of a middleware component, the scheduler:

1. guarantees no thread or memory oversubscription by managing memory and thread resources across multiple processes and their offloads 2. guarantees fairness so every offload and process gets a turn to use the resources it requests 3. respects priority so that processes and offloads with higher priority get preferential treatment (while still ensuring fairness)

4. makes a best-effort attempt in achieving QoS targets for well-behaved processes and offloads. This includes penalizing offending offloads and processes that repeatedly overrun their requested resources by using them for longer than originally asked for.

The scheduler is a part of the middleware on top of the manycore micro kernel and the runtime. The middleware handles multi-processing on coprocessor-based servers by automatically avoiding thread and memory oversubscription and load balancing processes across the cores of the coprocessor and across several coprocessors. The system is completely transparent to the users and requires no changes to the underlying software such as the MPSS and the Linux kernel running on the coprocessor. It uses a scheduling technique to schedule processes and coprocessor offload regions within processes simultaneously. It also uses algorithms to set thread affinity and load balance processes across coprocessors.

The system achieves faster operation when multiple processes share a many integrated core coprocessor system. Faster operation includes end-to-end turn-around-time per process (latency), as well as the number of processes completed per unit time (throughput).

The system protects against thread and memory over-subscription resulting in severe performance loss and crashes. Within a coprocessor, it manages cores such that offloads of different processes run on separate sets of cores, and offloads in the same process use the same cores (thus respecting data affinity). The system load balances multiple processes across multiple Xeon Phi coprocessors. The manager provides a transparent user-level middleware that includes a suite of run-time techniques explicitly designed to enhance performance portability in the presence of multi-processing.

BRIEF DESCRIPTION OF THE DRAWINGS

FIG. 5A-5H show exemplary scheduling procedures for the system of FIG. 1A.

DESCRIPTION

Figure 1A:
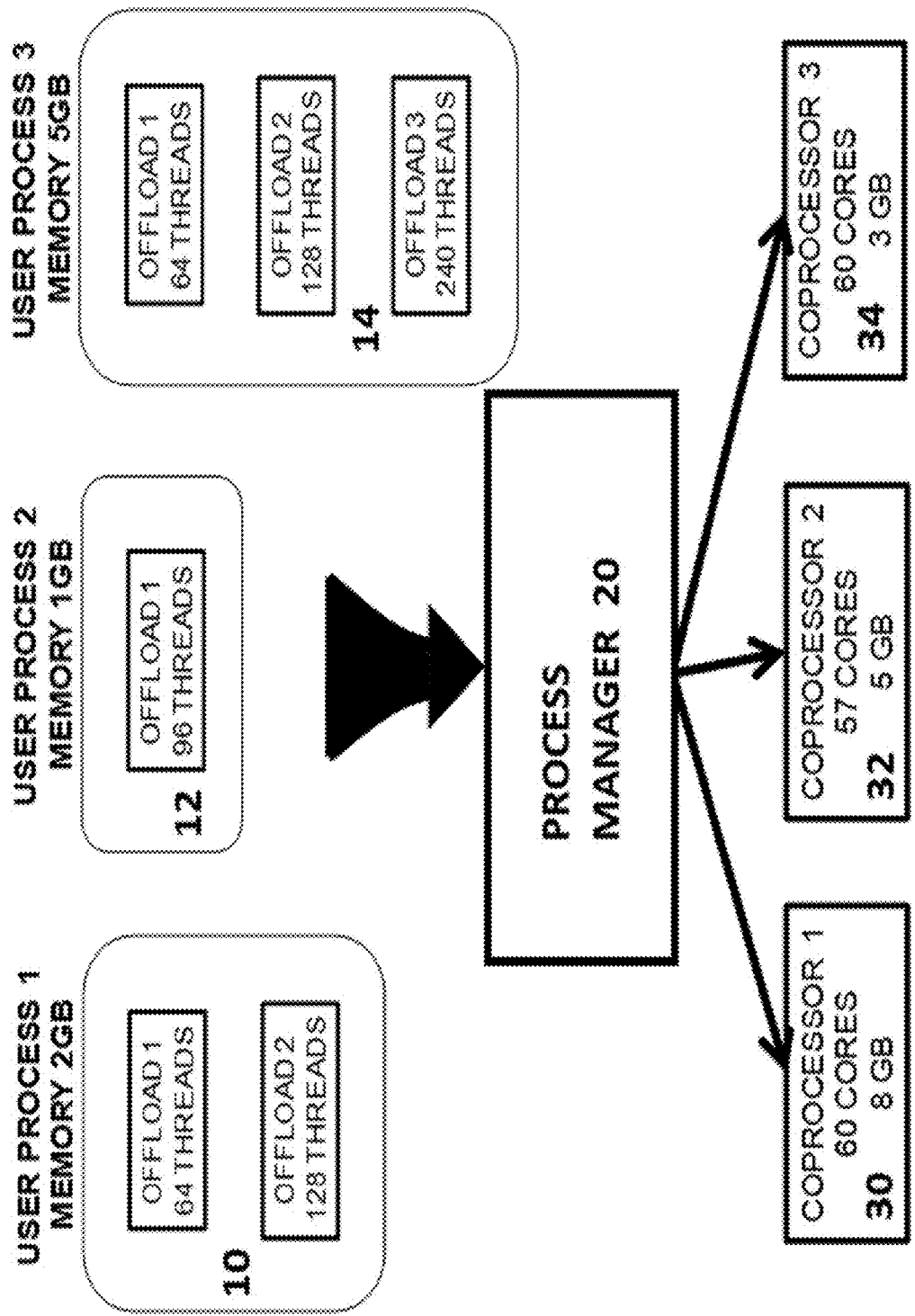
FIG. 1A shows an exemplary process manager for a multiprocessor system.

FIG. 1A shows a high-level view of a process manager 20 called the COSMIC system. In a server with multiple coprocessors 30, 32 and 34 such as the Intel Xeon Phi, each with different amounts of memory and cores, COSMIC manages offloads from several user processes 10, 12 and 14. Each user process contains several offload blocks that are executed sequentially. The process has a single memory requirement for all its offloads, while the offloads themselves have their own thread requirements. Thus, before execution, every process requests the process manager 20 for memory, and every offload requests the process manager 20 for threads. COSMIC arbitrates the requests by taking into consideration the different available coprocessors, the available cores within each device and the available memory. It then schedules and allocates resources for the offloads in such a way that thread and memory oversubscription are avoided, and the devices as well as the cores within them are load balanced. COSMIC manages processes and coprocessor resources to achieve the following:

Avoid over-subscribing coprocessor hardware threads.

Avoid over-subscribing and carefully manage the limited coprocessor main memory.

Map threads to cores, ensuring minimal thread migration, while respecting data affinity and persistence across offload regions.

Load balance applications across multiple coprocessors while ensuring locality of data.

Given a server populated with multiple integrated cores such as the Xeon Phi coprocessors, with several users and processes competing for coprocessor resources, the goals of the process manager 20 are to manage processes and coprocessor resources and:

Avoid over-subscribing coprocessor hardware threads.

Avoid over-subscribing and carefully manage the limited coprocessor main memory.

Map threads to cores, ensuring minimal thread migration, while respecting data affinity and persistence across offload regions.

Load balance applications across multiple coprocessors while ensuring locality of data.

To simplify memory management, one implementation requests that the programmer specify the maximum memory required on the Xeon Phi for each process. This is similar to job submission requirements in cluster schedulers. In typical cases, different offloads of the same process often share data in order to reduce data movement between the host and Xeon Phi. Thus, as long as the process exists, it will use memory on the card. However, unlike cluster schedulers, this embodiment does not require the process specify core, devices or other resources, but infers it automatically from the number of threads requested by the offload. Unlike memory that is reserved for the life of a process, threads (and cores) are given to an offload when it starts executing and released when the offload completes for use by other offloads.

Before execution, every process requests COSMIC for memory, and every offload requests COSMIC for threads. COSMIC arbitrates the requests by taking into consideration the different available coprocessors, the available cores within each device and the available memory. It then schedules and allocates resources for the offloads in such a way that thread and memory oversubscription are avoided, and the devices as well as the cores within them are load balanced.

COSMIC has several parameters that may be set by the server administrator or user that can affect its policies and behavior. An administrator can configure the following parameters of COSMIC to affect its scheduling decisions:

Aging threshold: how many times the scheduler attempts a process or offload before progress is blocked.

Thread factor $T_o$ (1 or larger): the offload "fit" function considers $T_o$*hardware threads as the total number of threads in a coprocessor. If $T_o$ is greater than 1, the number of threads is oversubscribed in a measured way to leverage the fact that slight oversubscriptions may actually be beneficial since otherwise offloads may have to wait longer.

Memory factor $M_o$ (1 or larger): the process "fit" function considers $M_o$*physical memory as the total physical memory of the coprocessor. If $M_o$ is greater than 1, the memory is oversubscribed in a measured way to leverage the fact that not all processes will require their maximum requested memory at the same time.

COSMIC also expects from the owner of each process the following directives:

Memory limit: the peak memory the process will use over its lifetime. COSMIC kills any process that exceeds its memory usage as described later in this section.

Preferred thread affinity: In order to allocate Xeon Phi cores for an offload, COSMIC needs to know how user threads must be mapped to cores. A SCATTER mapping indicates 1 thread per core, a COMPACT mapping 4 threads per core and BALANCED 3 threads per core.

In one embodiment, the input to the scheduler of FIG. 1A may include the following:

User specifies maximum amount of memory per process, and use of host

User sets environment variable COSMIC_PROCESS_MAX_MEMORY (default: 400 MB per process)

User sets environment variable COSMIC_MIC_ONLY (default: 0)

Admin specifies the following parameters (in a configuration file):

Aging threshold (assumes the value 0 or any positive integer)

Scheduler chooses to skip (not schedule) the process (or offload) at the head of the queue if currently available resources are inadequate However, a process (or offload) can be skipped at most "aging threshold" times. After that, the scheduler must schedule the process (or offload) to ensure fairness. If enough resources are not available, then the scheduler waits until adequate resources become available Default: 100

RAM fraction to use: $R_f$ (assumes values between 0 and 1)

Certain portions of RAM are reserved for use by the OS, daemon processes, etc.

$R_f$ is the fraction of MIC physical RAM that the scheduler assumes is available for apps Default: Ratio of measured value of free RAM at the time COSMIC is started and total RAM per MIC Swap fraction to use: $S_f$ (assumes values between 0 and 1)

Scheduler uses (($R_f$*MIC physical memory)+($S_f$*SWAP space)) as available memory per MIC This parameter can be tuned to increase the number of processes that are executing concurrently on the MIC Default: 0

Memory over-scheduling: $M_O$ (assumes values greater than or equal to 1)

Scheduler uses $M_o$*(($R_f$*MIC physical memory)+($S_f$*SWAP space)) as Memory Resource Limit per MIC This parameter can be tuned to increase concurrency by leveraging the fact that all resident processes will not simultaneously use their maximum requested memory E.g., a process ends before another process has reached its peak memory usage Default: 1

Thread over-scheduling: $T_o$ (assumes a value greater than or equal to 1)

Scheduler uses ($T_o$*4*number of cores in a MIC) as Thread Resource Limit per MIC (4 hardware threads per core)

This parameter can be tuned to increase the number of processes that are executing concurrently on a MIC Default: 1

Enable use of host when scheduling a process (yes/no, default: yes)

The scheduler executes the following pseudo code in one embodiment:

```
while (new event) {
    if (there is a process to be scheduled) {
        /* Process scheduler: schedule a process in Process queue */
        schedule(Process_Queue,
            firstFit(Memory Resource Limit),
            aging_threshold);
    }
    For each Phi card {
        if (there is an offload to be scheduled) {
            /* Offload scheduler: schedule an offload in Offload queue */
            schedule(Offload_Queue,
                firstFit(Thread Resource Limit),
                aging_threshold);
        }
    }
}
```

In one implementation of the above pseudo-code, a blocking call is done and triggered by (i) a new process arrival, (ii) a new offload arrival, (iii) an offload dispatched, (iv) an offload completion, (v) a process completion. The scheduler returns true if any of above events occurred since last call.

Figure 1B:
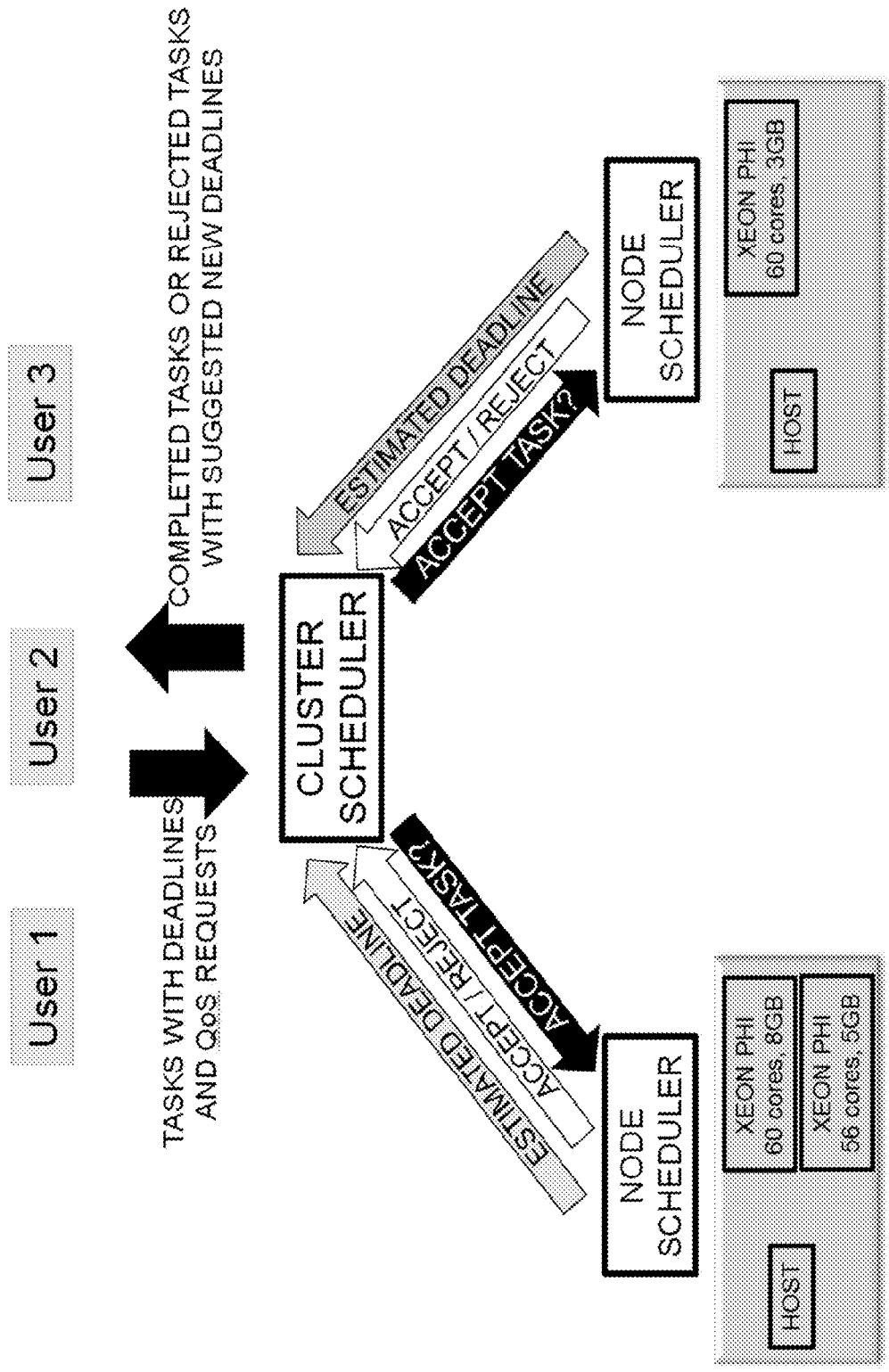
FIGS. 1B-1D show in more details the process manager of FIG. 1A.
Figure 1C:
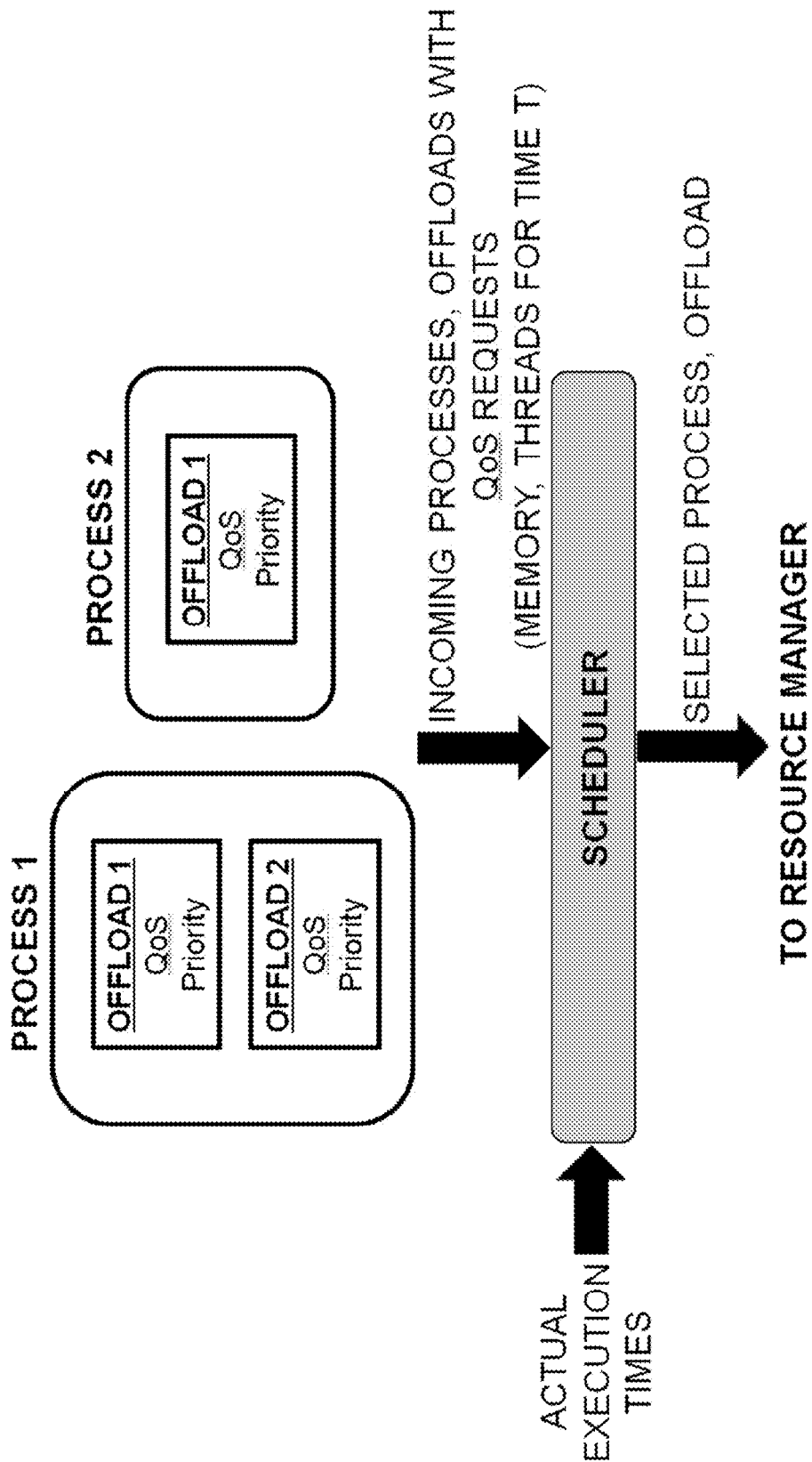
Figure 1D:
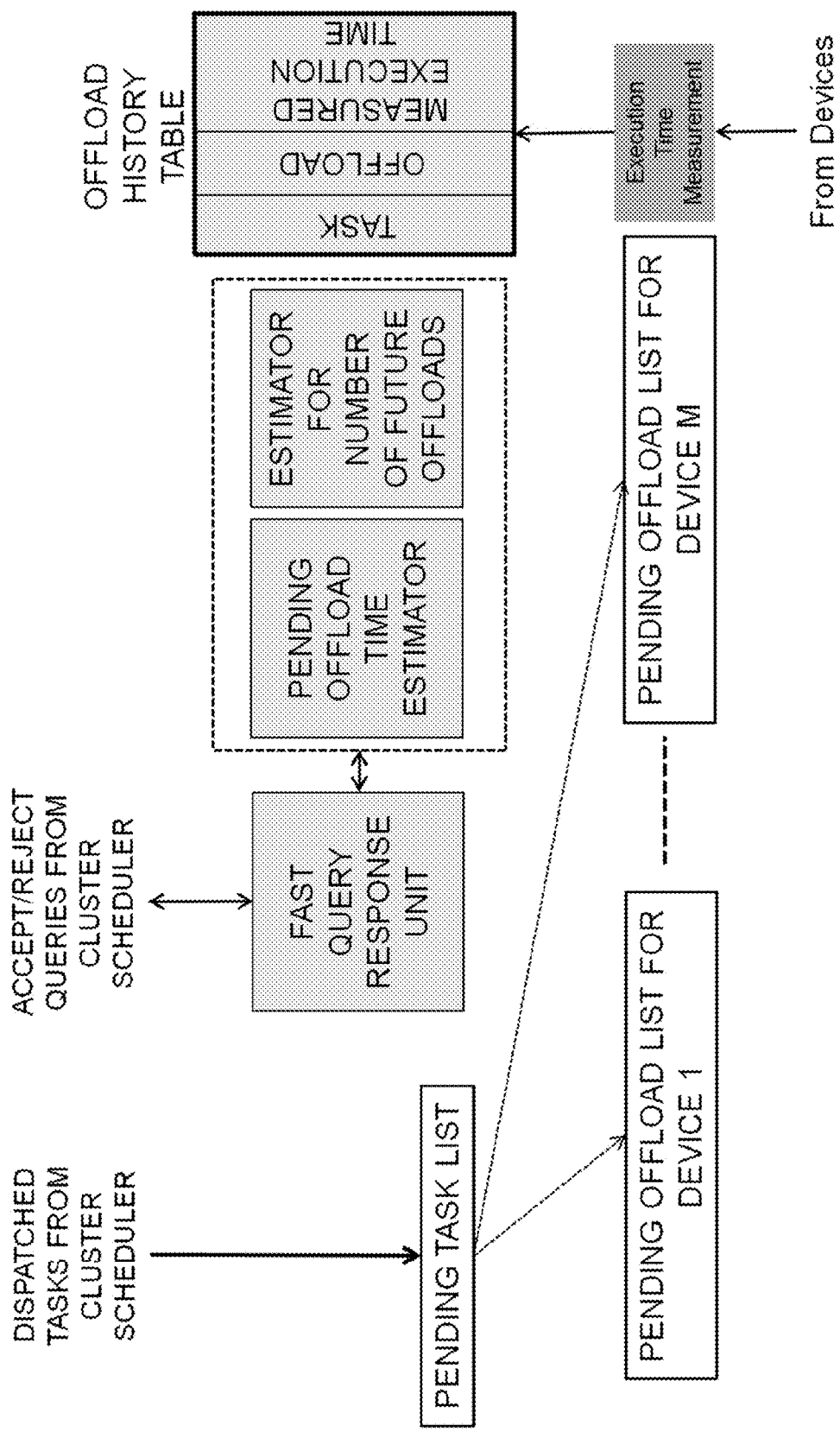

FIGS. 1B-1D shows in more details the process manager of FIG. 1A. In FIG. 1B, a cluster scheduler receives tasks with deadlines and quality of service (QoS) requests from users 1-3, for example. The cluster scheduler communicates with one or more node schedulers, which control each host computer, each in turn having one or more multi core processor cards therein. The cluster scheduler and node scheduler communicates work requests and acceptance/rejection from the node scheduler as well as the estimated deadline information. The cluster scheduler in turn communicates completed tasks or rejected tasks with suggested new deadlines back to user processes.

The cluster scheduler accepts tasks from users where each task specifies a deadline, and requests a certain total processing time, a specific number of Xeon Phi devices and peak memory on each device. Upon receiving a task, the cluster scheduler sends queries to each node scheduler to find out which nodes can accept the task. The node schedulers respond by indicating they can accept or reject the task. If they indicate they can accept the task, an estimated completion time along with a confidence level is provided. The cluster scheduler uses this information to select a node to which the task can be dispatched, or rejects the task and suggests a better deadline to the user so that the task can be resubmitted.

FIG. 1C shows in more details the processes, each with one or more offload requests with QoS and priority specification. The incoming requests are processed and based on actual execution times, the scheduler selects the process and offloads the process to a resource manager for execution.

FIG. 1D shows in more details the node scheduler. Tasks dispatched from the cluster scheduler enter a pending task list which are distributed over a plurality of devices 1 ... M. The execution time measurement information from devices is provided to an offload history table, which stores information on tasks, offloads, and measured execution time. This information is used in estimators for pending offloads and number of future offloads. The estimator outputs are used by a fast query response unit to accept or reject queries from the cluster scheduler.

FIG. 1D shows the main components of the node level scheduler. It consists of (i) a list of pending tasks, (ii) a list of pending offloads per Xeon Phi device, (iii) a processing time estimator for pending offloads and (iv) an estimator for the number of future offloads of a task. The estimators rely on measuring offload execution times, and a history table as shown in the figure. The estimators are used in urgency-based scheduling for tasks and their offloads, as well as in providing a fast response to cluster scheduler queries.

Each task dispatched to the node from the cluster scheduler is added to the list of pending tasks. Once a task is scheduled, its offloads are added to the appropriate pending offload list as they arrive.

When the cluster scheduler provides the node with task parameters $<d_{ij}, x_{ij}, p_{ij}, m_{ij}>$ and queries if the task can be accepted, the node scheduler first checks if it can satisfy the number of Xeon Phi cards requested, as well as the peak memory requested on each card. If not, the node indicates it will reject the task if the task were to be dispatched to it. If resources are potentially available, the node scheduler computes an estimated completion time for the task by examining all tasks currently executing, and all tasks in the pending task list. For each task in flight, it finds the processing time remaining by subtracting the time the task has already executed from the user-provided total processing time. For each task in the pending task list, it aggregates the user-provided processing times. The estimated completion time for task $t_{ij}$ is the sum of the remaining execution times for tasks in flight, the aggregated processing times for pending tasks, and the estimated processing time of $t_{ij}$. For node n:

$$est_{ij}^n = \text{remaining time for tasks in flight} + \text{aggregated processing times for pending tasks} + p_{ij}$$

The confidence level depends on the number of tasks. That is, if the node has a large number of pending or executing tasks, its confidence level is low. If the node has no pending or executing tasks, its estimate will be more accurate, and hence its confidence level is high. The confidence of node n for estimating the completion time of task $t_{ij}$ is given by:

$$conf_{ij}^n = 1/(1 + \#\text{pending tasks on } n + \#\text{executing tasks on } n)$$

A key distinction between the node scheduler and traditional operating system schedulers is that the system concurrently schedules tasks and offloads. Coprocessors in the Xeon Phi server may have different memory and thread availabilities depending on ongoing multiprocessing. The node scheduler not only takes into account these dynamically varying availabilities, but it also ensures fairness, i.e., it makes sure that all tasks and offloads eventually get access to coprocessor resources. The node scheduler is event-based. A scheduling cycle is triggered by a new event that can be the arrival of a new task, the arrival of a new offload in an existing task, the dispatching of an offload to a Xeon Phi device, the completion of an offload or the completion of a task. It uses the concept of urgency, and selects at each scheduling cycle the most urgent task or offload from the list of pending tasks and offloads. As shown in FIG. 1D, at each new event, the node scheduler examines the pending task list and the pending offload lists for each coprocessor. It selects a task or offload based on resource availability (the "fit" function) and urgency.

Figure 2:
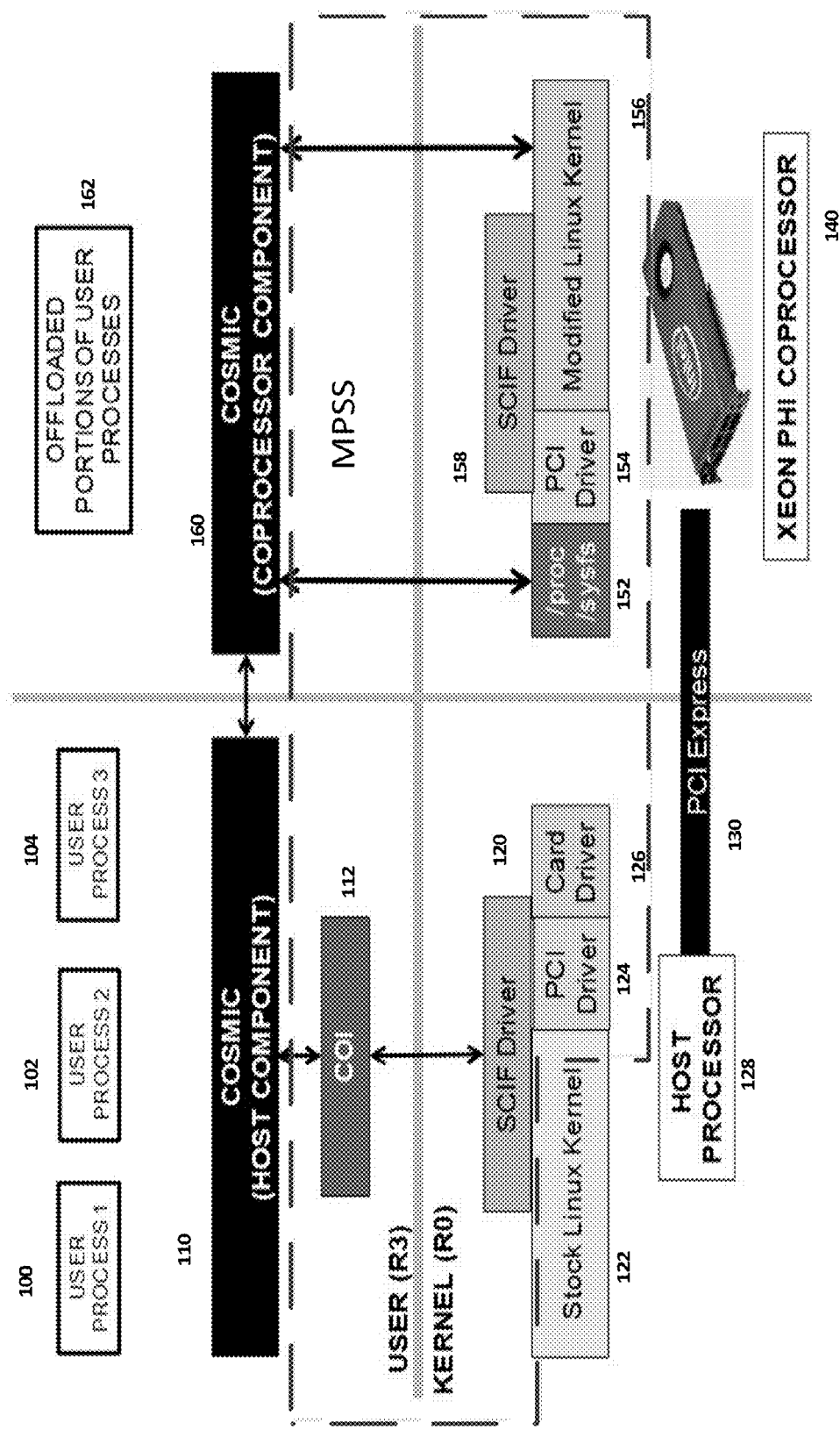
FIG. 2 shows an exemplary software stack with host and co-processor components of the multi-processor software stack.

FIG. 2 shows a block diagram of the Xeon Phi software stack, and where COSMIC fits in. The left half of the figure shows the stack on the host processor, while the right half shows the stack running on the coprocessor. The top half represents user space, and the bottom half represents kernel space. The host processor runs a Linux kernel 122 with a PCI and card driver 124-126 to communicate with the card. Along with the operating system, a Symmetric Communication Interface (SCIF) driver 120 is provided for inter-node communications. A node can be a Xeon Phi device or the host processor. SCIF 120 provides a set of APIs for communication and abstracts the details of communicating over the PCIe bus. On top of SCIF 120, the Coprocessor Offload Infrastructure (COI) 112 is a higher-level framework providing a set of APIs to simplify development of applications using the offload model. COI provides APIs for loading and launching device code, asynchronous execution and data transfer between the host and Xeon Phi. The coprocessor portion of the software stack consists of a modified Linux kernel 156, the PCI driver 154 and the standard Linux proc file system 152 that can be used to query device state (for example, the load average). The coprocessor portion also has a SCIF driver 158 for communicating over the PCI bus with the host and other nodes. The COI 112 communicates with a COSMIC host component 110 that communicates with user processes 100-104. The host component 110 interacts with a COSMIC coprocessor component 160 that handles offloaded portions of user processes 162.

The COSMIC host middleware component has a global view of all processes and offloads emanating from the host, and knowledge of the states of all coprocessor devices. COSMIC is architected to be lightweight and completely transparent to users of the Xeon Phi system. As shown in FIG. 2, COSMIC exists in the user space, but interacts with both user processes and other kernel-level components. It controls offload scheduling and dispatch by intercepting COI API calls that are used to communicate with the device. This is a key mechanism of COSMIC that enables it to transparently gain control of how offloads are managed.

The Xeon Phi compiler converts all offload blocks that are marked by pragmas into COI calls. The user's program with offload pragmas is compiled using Intel's icc or a gcc cross-compiler for the Xeon Phi. The compiler produces a host binary, and Xeon Phi binaries for all the offload portions. The offload portions are first translated into a series of COI API calls. The figure shows the important calls for a simple example: first COIEngineGetCount and COIEngineGetHandle get a handle to the coprocessor specified in the pragma.

Then COIProcessCreateFromFile creates a process from the binary corresponding to the offload portions. Each offload block is represented as a function, and COIProcessGetFunctionHandles acquires the handles to these functions. COIPipelineCreate creates a "COI pipeline" which consists of 3 stages: one to send data to the coprocessor, one to perform the computation and one to get data back from the coprocessor. Then COIBufferCreate creates buffers necessary for inputs and outputs to the offload. In this example, three COI buffers corresponding to the arrays a, b and c are created. COIBufferCopy transfers data to the coprocessor, and COIPipelineRunFunction executes the function corresponding to the offload block. Finally, another COIBufferCopy gets results (i.e., array c) back from the Xeon Phi.

In one embodiment, the off load request input is as follows:

```
#pragma offload target(mic:1)         \
    in(a: length(SIZE))               \
    in(b: length(SIZE))               \
    inout(c: length(SIZE))
    for (int i = 0; i < SIZE; i++)
        c[i] = a[i] + b[i];
```

A cross compiler maps this request into the following exemplary requests:

```
/* get handle to coprocessor */
COIEngineGetCount(...);
COIEngineGetHandle(...);
/* create a process from the binary representing
   the offload block */
COIProcessCreateFromFile(...);
COIProcessGetFunctionHandles(...);
/* create a COI pipeline */
COIPipelineCreate(...);
/* create input buffers: a, b and c */
COIBufferCreate(...);
/* copy the buffers to the coprocessor */
COIBufferCopy(...);
/* run the function representing the offload region */
COIPipelineRunFunction(...);
/* copy results back */
COIBufferCopy(...);
/* clean up */
COIBufferDestroy(...);
COIProcessDestroy(...);
```

Since every offload is converted into a series of COI calls (which has a standard API), COSMIC can transparently control offload scheduling and dispatch.

COSMIC is architected as three components implemented as separate processes: the client, the scheduler and the monitor, the latter comprising a host portion and a card-side portion, as depicted in FIG. 2. Inter-process interfaces are clearly defined: each process communicates with the other two using explicit messages.

The COSMIC client is responsible for intercepting COI calls and communicating with the COSMIC scheduler to request access to a coprocessor. It accomplishes this using library interposition. Every user process links with the Intel COI shared library that contains definitions for all API function modules. COSMIC intercepts and redefines every COI API function: the redefined COI functions perform COSMIC-specific tasks such as communicating with the COSMIC scheduler, and then finally calls the actual COI function. With the redefined functions, COSMIC creates its own shared library that is pre-loaded to the application (using either LD_PRELOAD or redefining LD_LIBRARY_PATH). The pre-loading ensures that COSMIC's library is first used to resolve any COI API function.

Based on the type of COI API intercepted, the client sends the following different messages to the scheduler:

NewProcess: When an offload is first encountered for a process, the client sends a NewProcess message to the scheduler indicating that the scheduler should account for a new process in its book-keeping. Every new process is annotated with its memory requirement provided by the user.

NewOffload: For every offload, the client sends a NewOffload message to the scheduler indicating the process to which the offload belongs and the number of threads it is requesting. It also indicates the size of the buffers that need to be transferred to the coprocessor for this offload.

OffloadComplete: When an offload completes, the client sends an OffloadComplete message to the scheduler so that it can account for the newly freed resources such as coprocessor cores and threads.

ProcessComplete: When a process completes, the client sends a ProcessComplete message to the scheduler to account for the freed memory used by the process.

The COSMIC scheduler is the key actor in the COSMIC system and manages multiple user processes with offloads and several coprocessor devices by arbitrating access to coprocessor resources. It runs completely on the host and has global visibility into every coprocessor in the system. In scheduling offloads and allocating resources, it ensures no thread and memory oversubscription and load balances coprocessor cores and devices to most efficiently use them.

A key distinction between the COSMIC scheduler and traditional operating system schedulers is that COSMIC concurrently schedules processes and offloads within the processes. Each process has a memory requirement, while each offload has a thread requirement. Various coprocessors in the system may have different memory and thread availabilities.

Under these constraints, the goal of the scheduler is to schedule processes and offloads by mapping processes to Xeon Phi coprocessors and offloads to specific cores on the coprocessors. The scheduler also ensures fairness, i.e., makes sure all processes and offloads eventually get access to coprocessor resources.

The scheduler is event-based, i.e., a scheduling cycle is triggered by a new event. A new event can be the arrival of a new process, the arrival of a new offload in an existing process, the dispatching of an offload to a Xeon Phi device, the completion of an offload or the completion of a process. A queue of pending processes is maintained: each arriving new process is added to the tail of the pending process queue. A process is eventually scheduled to one Xeon Phi coprocessor. The scheduler also maintains a queue of pending offloads for each Xeon Phi coprocessor in the system. Each new offload is added to the tail of the offload queue belonging to the Xeon Phi coprocessor on which its process has been scheduled. COSMIC has a client portion and a server portion. The client portion intercepts COI calls and communicates with the scheduler for coprocessor resources. It consists of a host process that links with the Intel COI shared library, and it intercepts and redefines every COI API function. The redefined COI functions first perform COSMIC-specific tasks, such as communicating with the COSMIC scheduler, and then invoke the original COI function. For the redefined functions, COSMIC creates its own shared library that is pre-loaded (using either LD_PRELOAD or by redefining LD_LIBRARY_PATH). The pre-loading ensures that the redefined COI functions in COSMIC are used instead of the COI functions defined in the Intel COI library. This is a fairly standard technique for interposing library calls, also referred to as API remoting.

Based on the intercepted COI call, the client sends different messages to the COSMIC scheduler:

NewTask: Sent when the first offload of a COI process (task) is intercepted. The scheduler can now account for and keep track of the COI process and its coprocessor memory requirement.

NewOffload: Sent when a new offload is intercepted. This message includes information about the COI process that the offload belongs to, the number of threads that the offload is requesting, and any affinity information.

OffloadComplete: Sent when an offload completes. This allows the scheduler to accurately account for recently freed resources such as coprocessor cores and threads.

TaskComplete: Sent when a task completes. This allows the scheduler to take into account the physical memory on the Xeon Phi that has now become available due to the completion of the COI process.

The COSMIC monitor collects data about the state of the coprocessors, and is the portion that measures execution times. It has a host-side component that communicates with several coprocessor-side components. The host-side component also communicates with the scheduler. The coprocessor-side components monitor the load on each coprocessor, the number of threads requested by each offload and the health (i.e. whether the COI process is alive or not) of each COI process.

In addition to COI API interception on the host, COSMIC also intercepts some programmer directives on the Xeon Phi. The coprocessor component of the monitor does this. One embodiment intercepts omp_set_num_threads to determine the number of threads requested by each offload. Upon interception, the monitor blocks the offload, and communicates with the scheduler using these messages:

OffloadPause: Sent to inform the scheduler that the offload has been paused.

OffloadResume: Received from scheduler. The paused offload has been cleared to run with the new thread requirement.

To enable urgency-based scheduling, the monitor performs two additional functions:

When offloads complete, the monitor records the offload's execution time in the scheduler's history table.

The monitor also measures the time between an offload completion and the arrival of a new offload, which is the time the task spent on the host and must be counted towards the overall task processing time.

Figure 3:
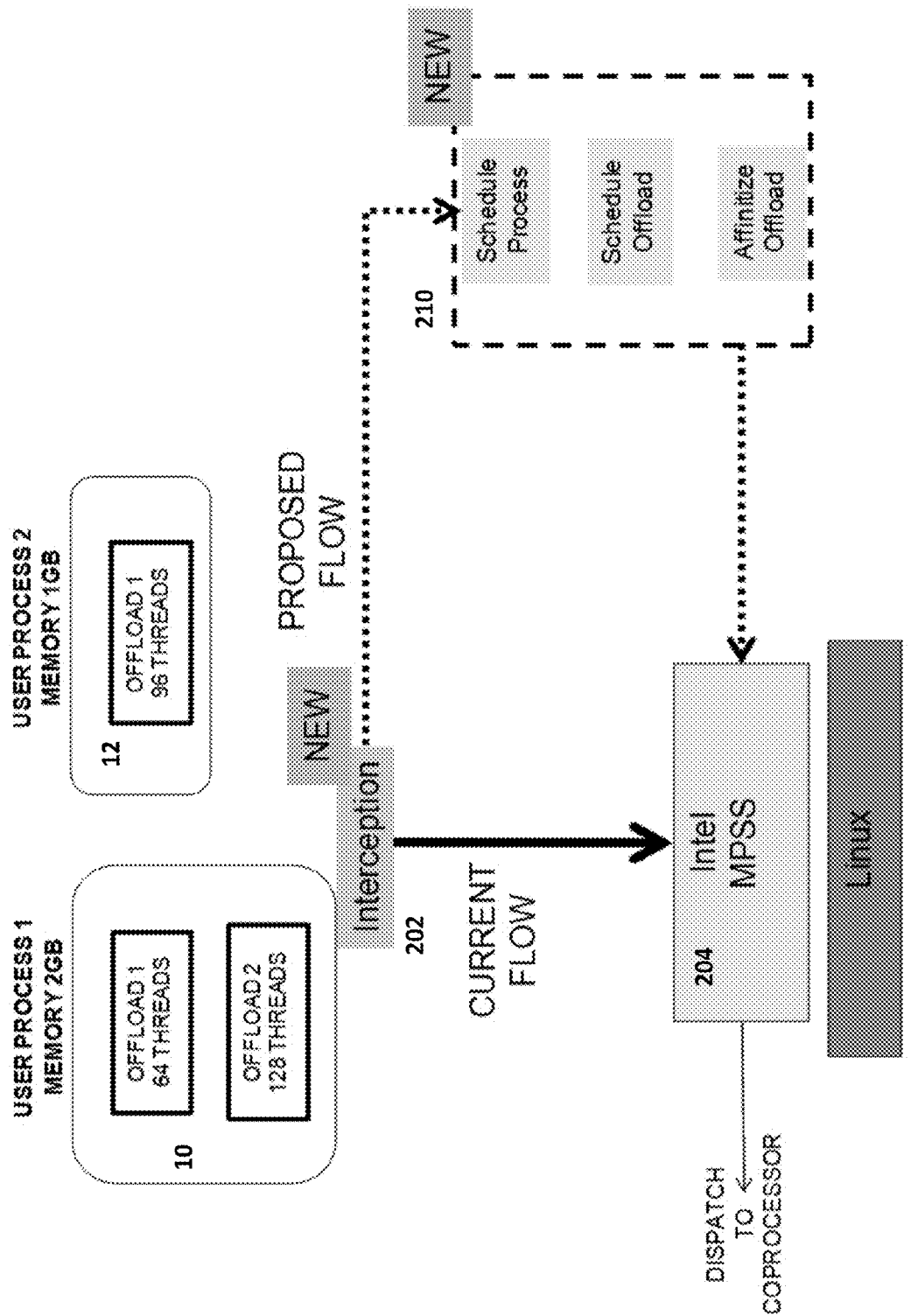
FIG. 3 shows an exemplary flow of the process manager of FIG. 1A.

FIG. 3 shows workflow through the Xeon Phi software stack when multiple processes are issued. They are all fed to the Xeon Phi MPSS runtime, which often serializes them in order to avoid crashing the coprocessor. The manager 20 avoids this by intercepting COI calls at 202, and the manager 20 takes control of the processes and offloads. Specifically, in 210 the manager 20 performs process scheduling, offloads scheduling and affinitizes offloads to specific cores on the co-processor. Once this is done, it issues the processes and offloads to the MPSS at 204 and continues with the Linux operating system 206.

Figure 4:
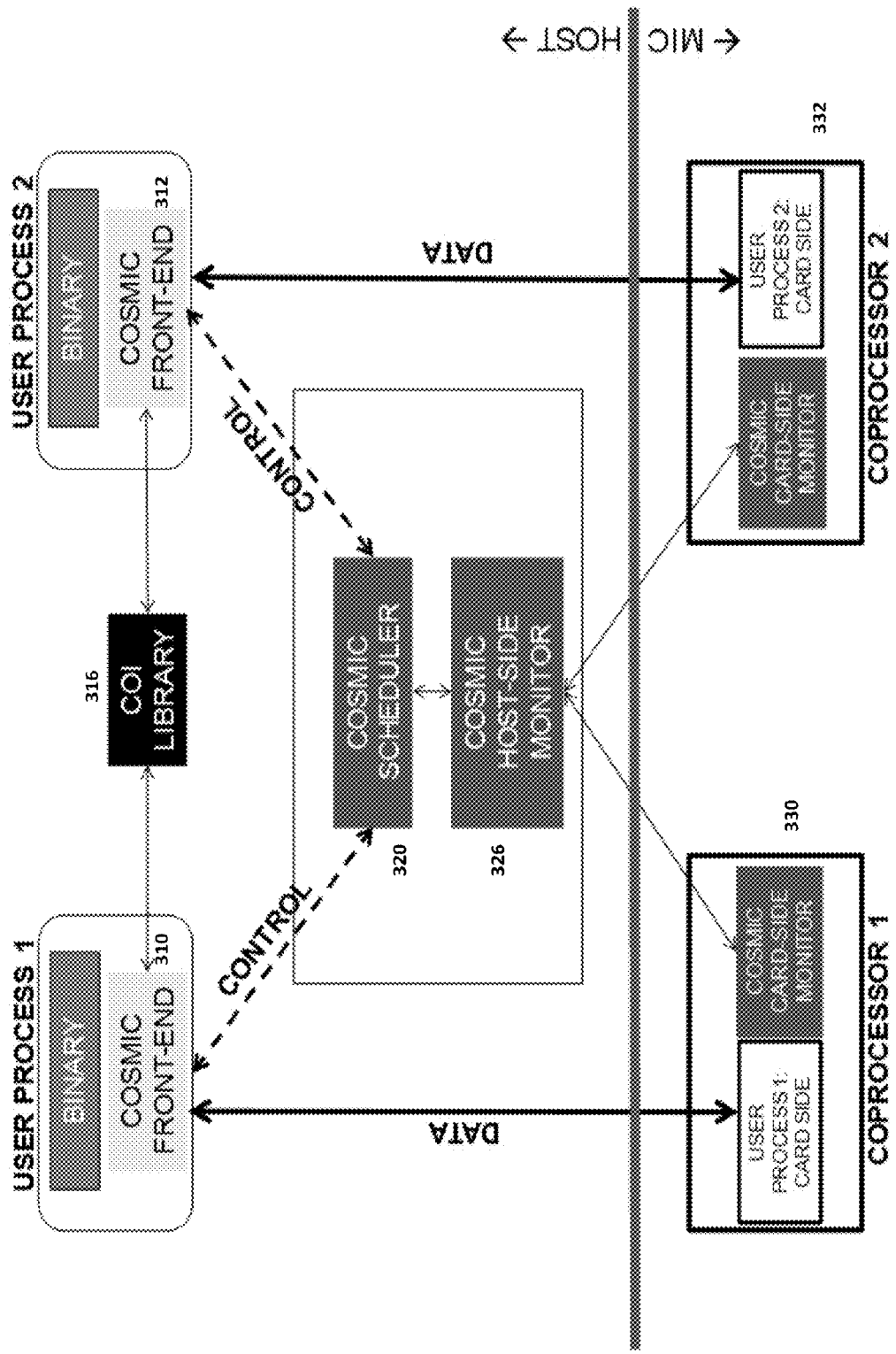
FIG. 4 shows an exemplary architecture of the process manager of FIG. 1A.

FIG. 4 shows an exemplary architecture of the process manager of FIG. 1. COSMIC is architected as three components implemented as separate processes: front-ends or clients 310-312 that communicate with a library 316, scheduler 320 and monitor 326, the latter comprising a host portion and a card-side portion. Inter-process interfaces are clearly defined: each process communicates with the other two using explicit messages.

FIG. 5A shows an exemplary scheduling procedure for simultaneously scheduling processes and offloads. The outer loop represents a scheduling cycle, which is initiated by a new event. A new event is triggered by the arrival or completion of processes or offloads. The scheduler maintains a single process list, and an offload list for each coprocessor device. When a new event occurs, a pending process is selected and scheduled to a coprocessor that has enough free memory. Then offload queues corresponding to each coprocessor are examined, and the scheduler dispatches an offload to each coprocessor if it has enough free threads. Both processes and offloads are selected based on an aging-based first-fit heuristic. When a new event occurs, a pending process is selected and scheduled to a coprocessor that has enough free memory. Then offload queues corresponding to each coprocessor are examined, and the scheduler dispatches an offload to each coprocessor if it has enough free threads. Both processes and offloads are selected based on an aging-based first-fit heuristic.

During each scheduling cycle, the scheduler examines the process list to select a process, and then examines each offload list in order to select one offload from each list. It selects at most one process from the process list and at most one offload from each offload list based on the following.

A Fit Function, which determines the eligibility of a process or offload, i.e., if the manycore processor has sufficient memory to satisfy a process' QoS, and sufficient memory and threads to satisfy an offload's QoS.

An Urgency function, which determines the best process or offload to schedule based on:

The process' or offload's priority

The process' or offload's age, which depends on how many times the scheduler has examined the process or offload The amount of time the process or offload has been waiting to execute since it arrived The credits the process has. The credits owned by a process reflect its past behavior: if the offloads belonging to the process use lesser time than they requested on their resources, the process accumulates credits. If they use more time than requested, the process loses credits.

The process' or offload's QoS, i.e., the time the process or offload has requested resources for, and the number of resources requested.

After examining both process and offload lists, the scheduler adjusts credits. When an offload completes, its owning process either gains or loses credits. If the offload uses less time than it requested, its owning process gains credits. Otherwise, credits are lost. Credits are used by the scheduler's urgency function, or may be adjusted against the user's accounts.

```
while (new event) {
    if (there is a process to be scheduled) {
        /* Process scheduler: schedule a process from Process List */
        schedule(Process List,
            fit(Memory Resource Limit),
            urgency(priority, age, arrival time, credit, QoS));
    }
    for each Manycore Coprocessor {
        if (there is an offload to be scheduled) {
            /* Offload scheduler: schedule an offload from Offload List */
            schedule(Offload List,
```

-continued

```
            fit(Thread Resource Limit),
            urgency(priority, age, arrival time, credit, QoS));
        }
    }
    for each Completed Offload
        adjustCredits(owning process, actual execution time, QoS);
}
```

Figure 5B:
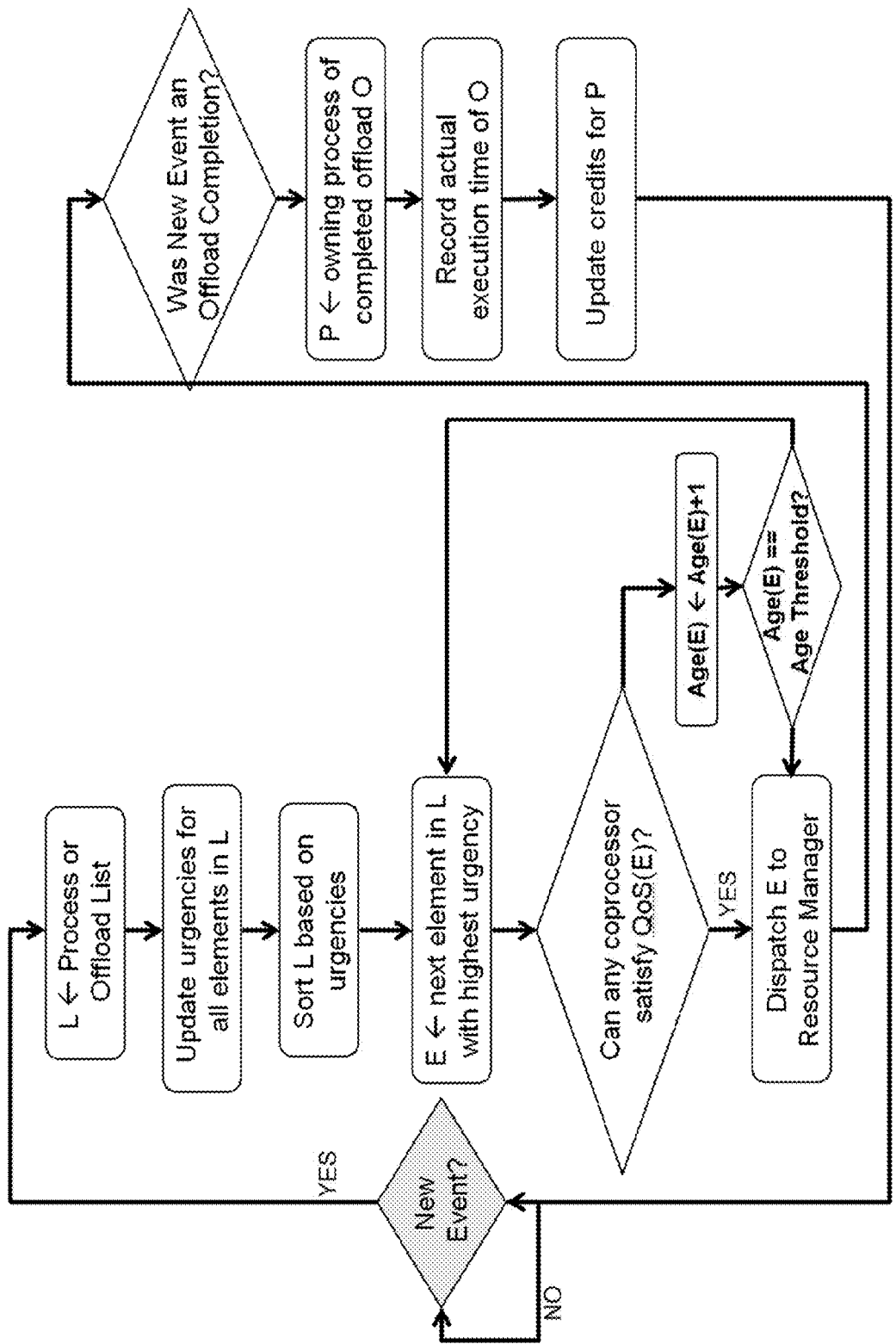

FIG. 5B shows the scheduling method with a new event monitor which triggers the scheduling cycle. The basic scheduling method is the same for both processes and offloads. First, the method receives a process or offload list. Next, the method determines urgencies for all elements in the process or offload list, and sorts the list based on urgency (urgency is any function of priority, age, waiting time, QoS and credits). It then picks the first element E with highest urgency whose resource request can be satisfied by a coprocessor in the server and checks for any coprocessor that can satisfy the QoS of E. If so, E is dispatched to the resource manager for further handling such as specific device and core allocation. If no device can provide resources for E at this time, the method increments the age of E and if the age reaches a pre-defined threshold in, E is dispatched anyway to the resource manager in which will block the scheduling process until E successfully starts to execute.

If the new event is an offload completion, credits for the owning processes are updated based on how long the offload took to actually execute. The process records the actual execution time of O. If the offload requested resources for duration T, and took less than time T to actually run, the process gains credits since the offload did not use its allocated time (but presumably the user paid for it). If on the other hand, the offload took longer, credits are deducted from the owning process. Next, the process loops to to process the next new event.

Figure 5C:
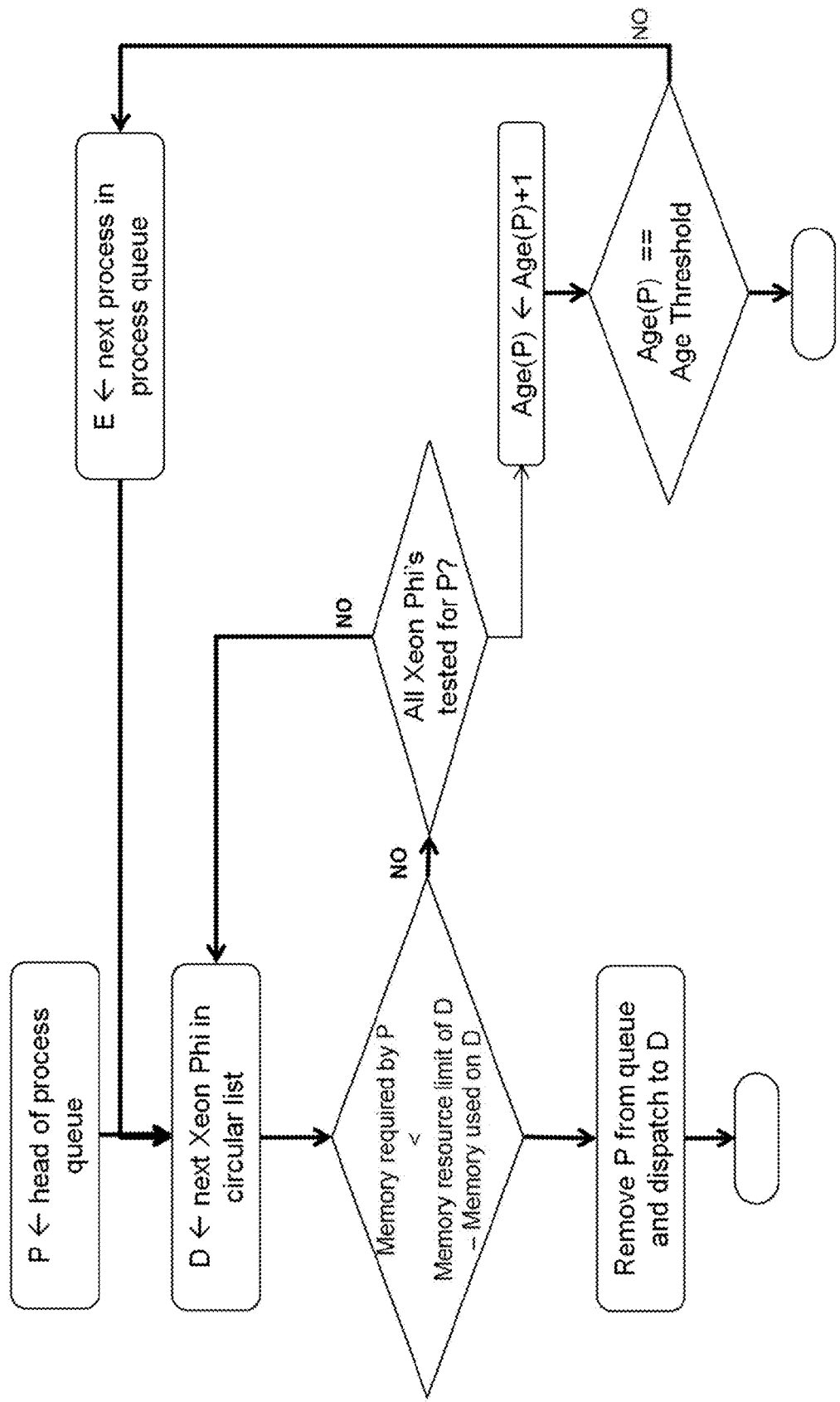
Figure 5D:
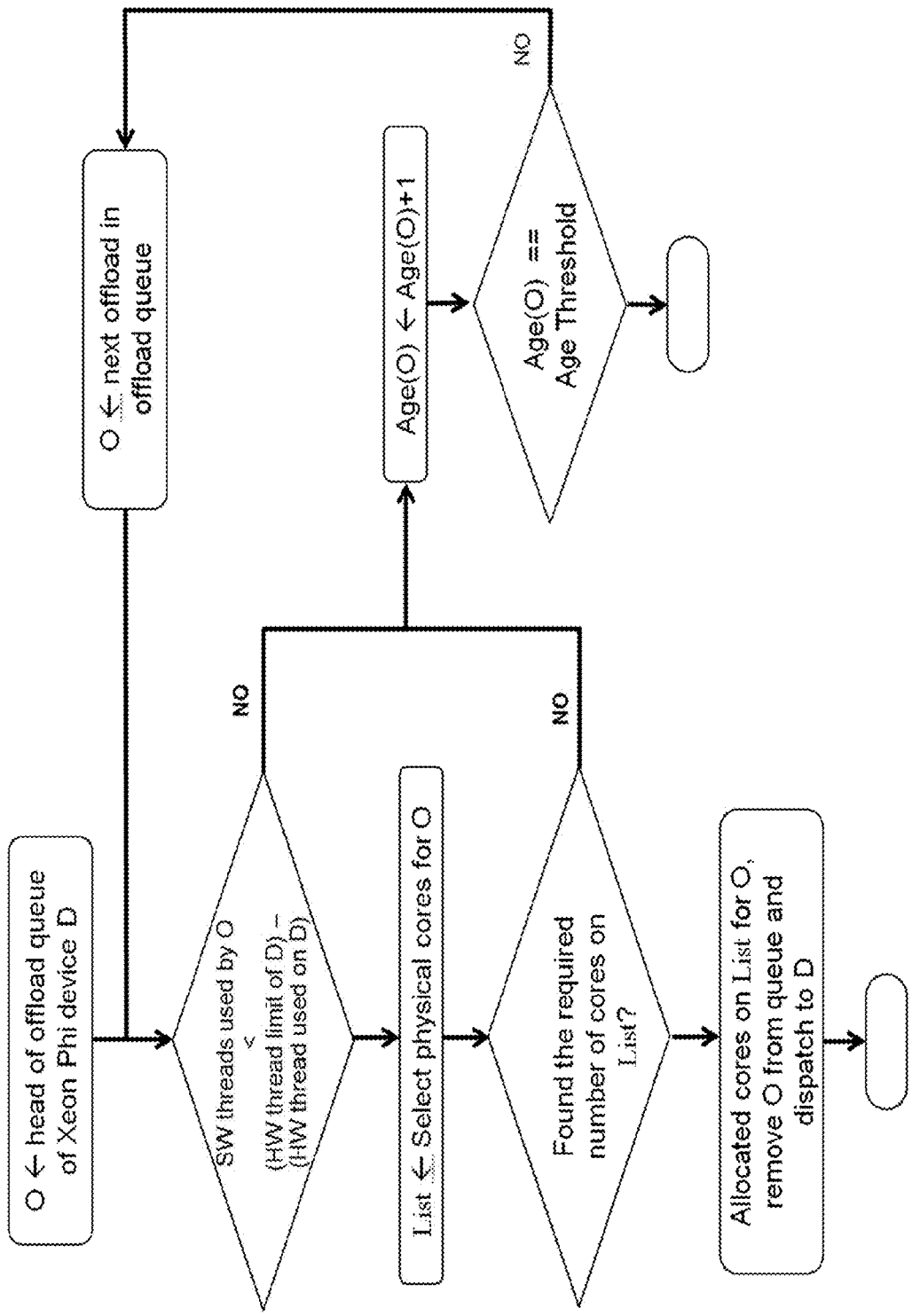
Figure 5E:
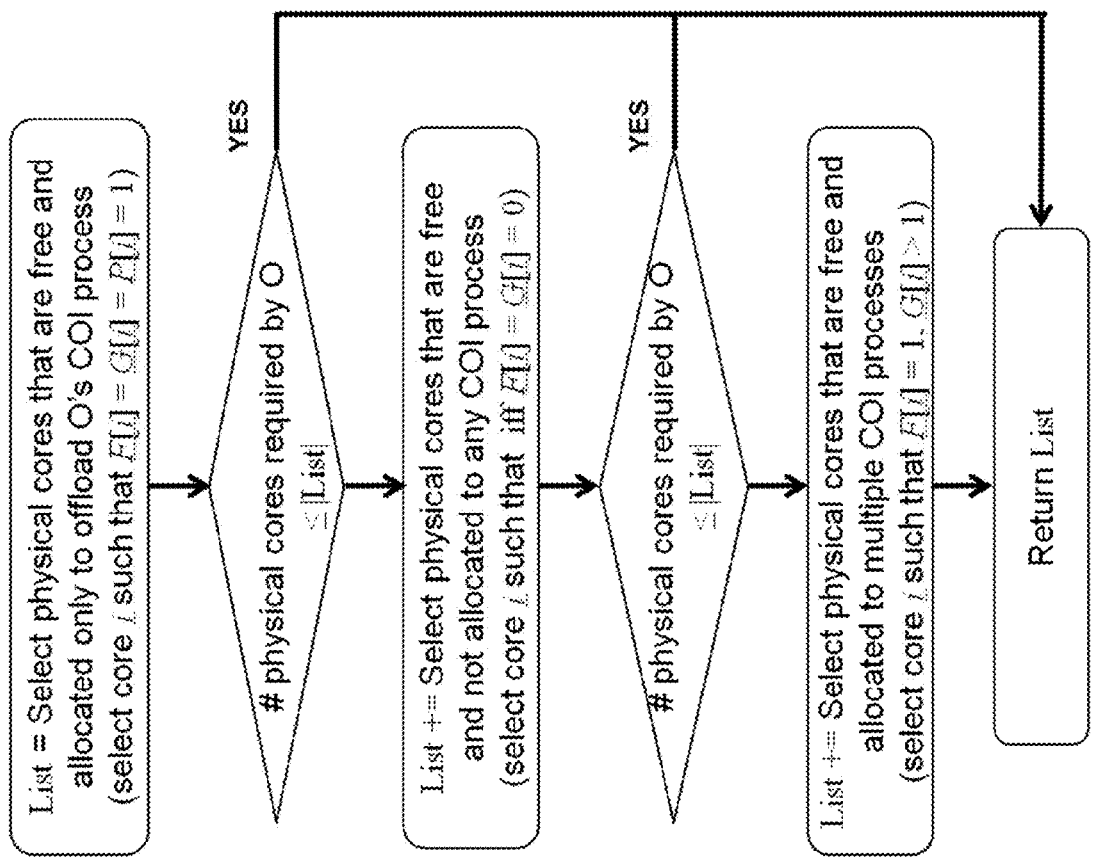

FIG. 5D shows an exemplary process to select the offload queue based on the number of allocated cores. The cluster scheduler accepts or rejects tasks from users, and selects server nodes to which it dispatches accepted tasks. The j'th task of $u_i$ is $t_{ij}$ and has deadline $d_{ij}$, requests an overall processing time $p_{ij}$ on the system, $x_{ij}$ Xeon Phi devices and required peak memory $m_{ij}$ on each device. The deadline and requirements of $t_{ij}$ are represented by the tuple $<d_{ij}, x_{ij}, p_{ij}, m_{ij}>$.

The cluster scheduler sends the deadline and requirements of each incoming task $t_{ij}$ to all server nodes. Each node responds by indicating it will either reject or accept the task if the cluster scheduler were to decide to dispatch the task to it. Insufficient resources imply immediate rejection: server node n rejects the task if it does not have the required number of Xeon Phi devices, i.e., if $x_{ij} > M_n$. It also rejects the task if it does not have enough devices with the required memory $m_{ij}$. If both Xeon Phi devices and memory are available, the node n indicates it can accept the task with an estimated completion time $est_{ij}''$ and confidence level $conf_{ij}''$.

For each task $t_{ij}$, the cluster scheduler collects responses from all server nodes. If every server node rejects the task, the cluster scheduler rejects the task citing insufficient Xeon Phi device or memory resources.

Figure 5F:
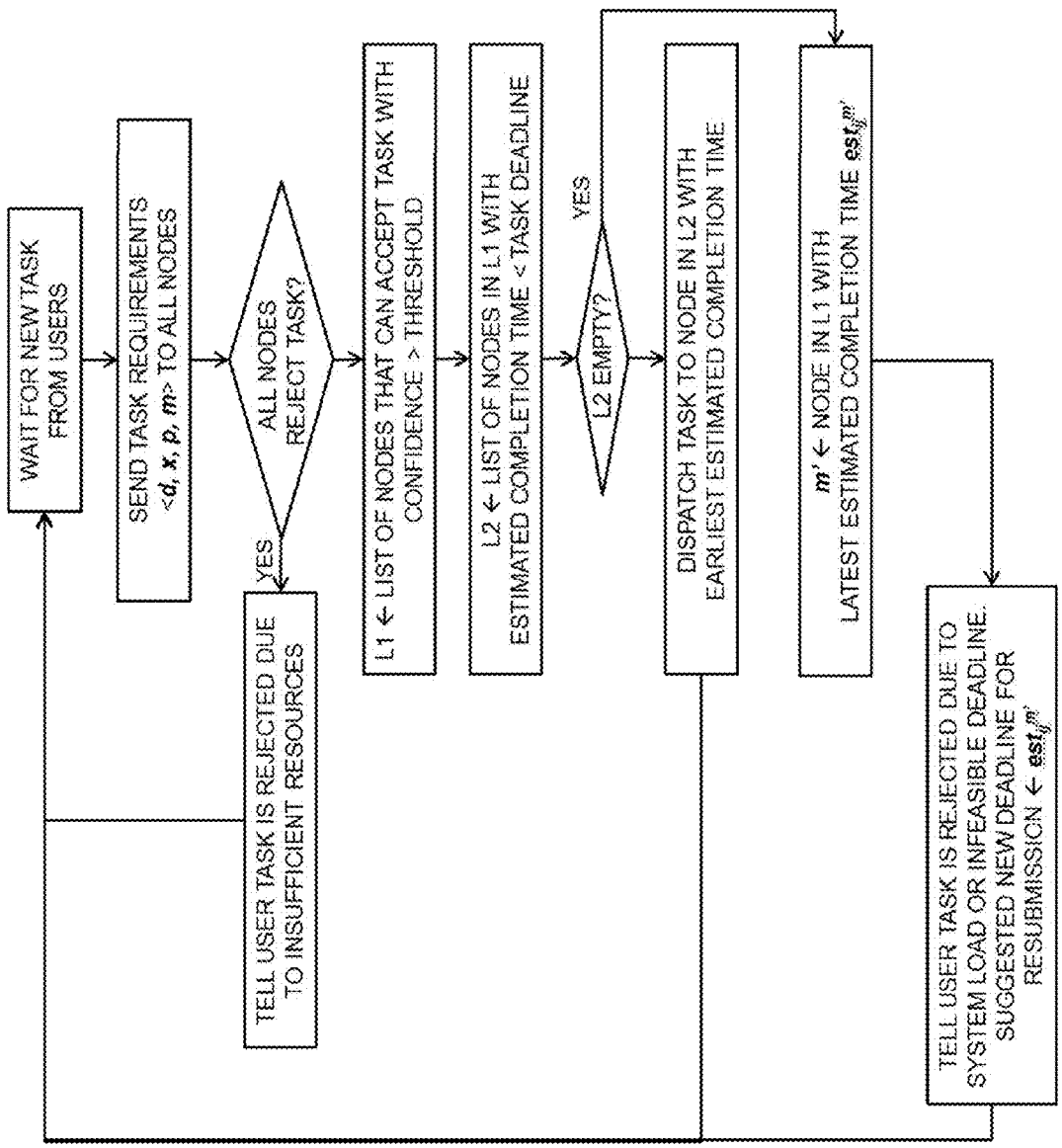

FIG. 5F shows the procedure for the cluster scheduler's node selection and task assignment procedures. From among all nodes that accept the task, the cluster scheduler obtains the subset of nodes L1 whose confidence level is above a cluster administrator-specified threshold. From L1, it obtains the set of nodes L2 whose estimated completion times are earlier than the task deadline. From among the nodes in L2, the task is assigned and dispatched to the node with the earliest estimated completion time. If no node meets the above criteria, the cluster scheduler selects the node m' whose confidence level is above the threshold and whose estimated completion time $est_{ij}^{m'}$ is the latest. It then rejects the task providing $est_{ij}^{m'}$ as the suggested new deadline if the user were to resubmit the task.

Credits are used to allow users flexibility and relax the accuracy with which processing times need to be specified. With the credit system, tasks that overrun their requested processing time slots are not killed, but allowed to complete. Instead such tasks use up credits of their users. Credits are used to offset slow running tasks with fast ones: a task that completes earlier than its requests processing time will gain credits for its user.

Figure 5G:
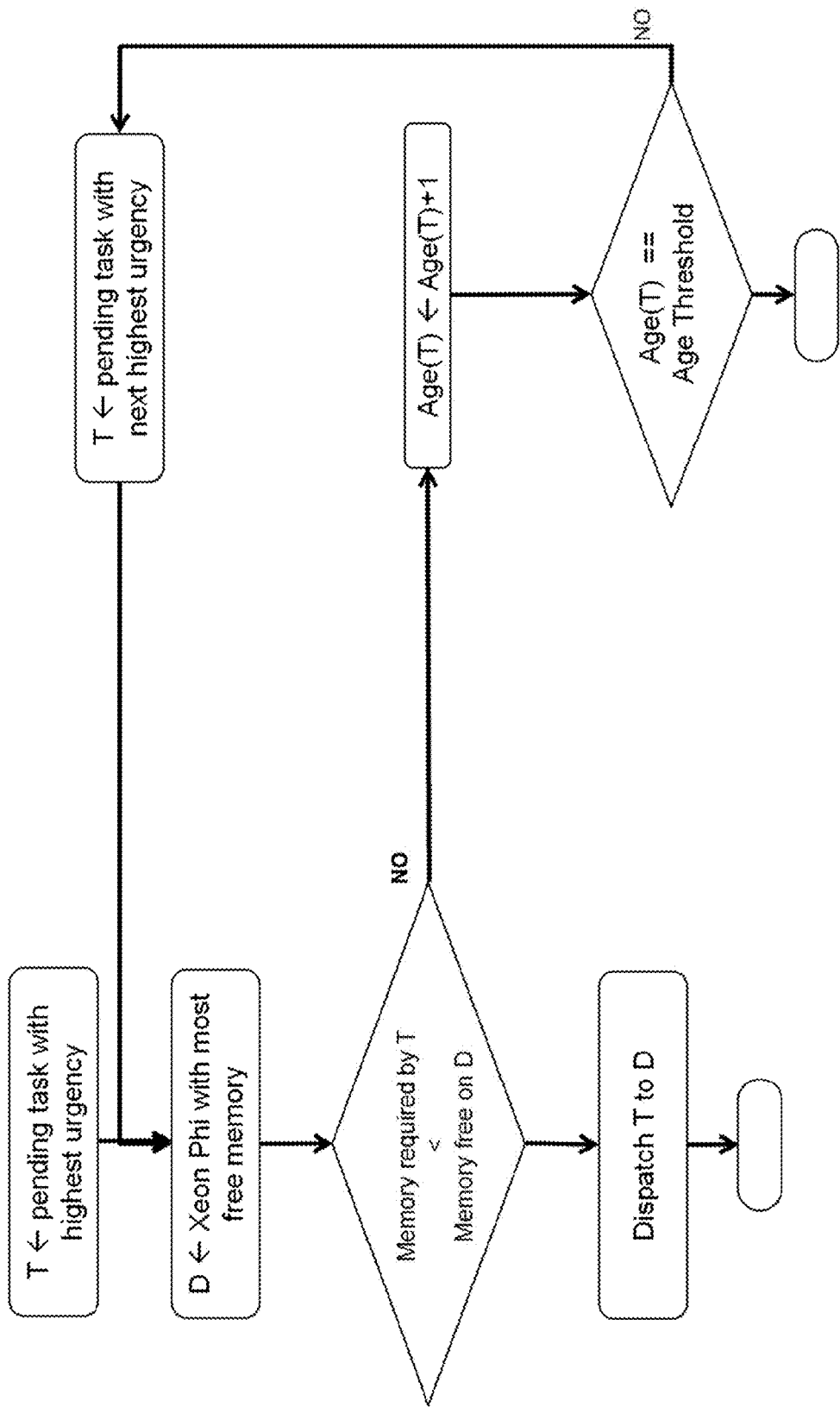

FIG. 5G shows the procedure for selecting a task. The procedure for selecting an offload is very similar. The system first selects pending task T with the highest urgency. Then the system selects the Xeon Phi device D with the most amount of free memory, and check if that will suffice for the task. If not, the task cannot be dispatched to any device, and the system increments its age. If the age reaches an administrator-specified threshold, the system blocks all scheduling until this task is scheduled. Otherwise, if the age is under the threshold, the system tries the task with the next highest urgency, and so on.

Figure 5H:
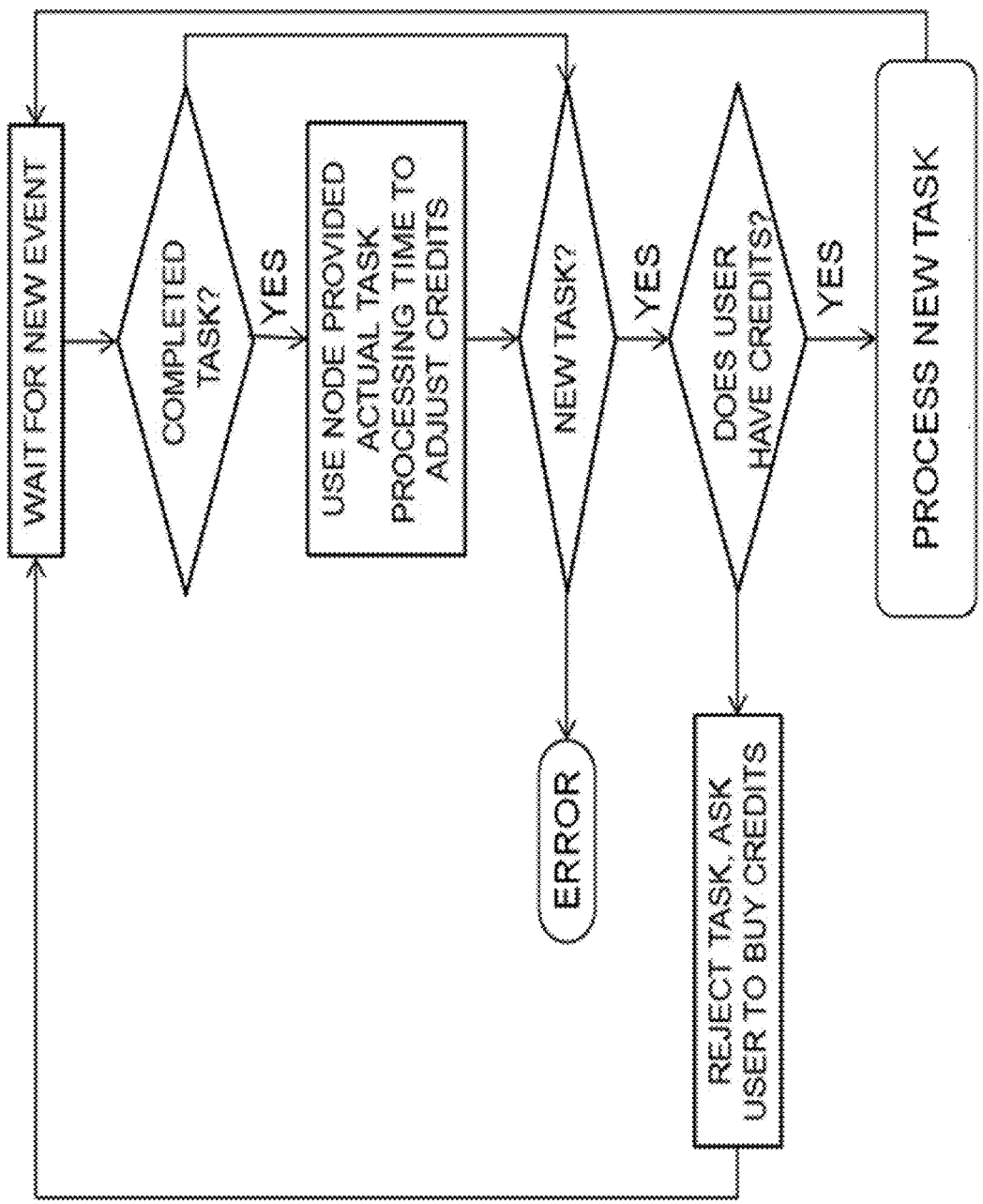

The cluster scheduler handles credits as shown in FIG. 5H. The cluster scheduler waits for a new event which must be a node completing a task $t_{ij}$, or a user issuing a new task. When a node completes a task, it reports the actual processing time of the task $p\_act_{ij}$. If $p\_act_{ij}$ is smaller than the requested processing time $p_{ij}$, user acquires credits equal to the difference. Otherwise the user loses credits:

$$C_i += p_{ij} - p\_act_{ij}$$

The cluster scheduler adjusts user credits on every task completion. When a new task arrives, the cluster scheduler checks the task user's credits. If the credits are low or zero, the task is rejected until the user buys credits.

The node level scheduler has two distinct functions. First, it receives task deadlines and requirements from the cluster level scheduler and either indicates it can accept or reject the task, providing an estimated completion time for tasks that it can potentially accept. Second, for tasks that have been assigned and dispatched to it by the cluster scheduler, the node scheduler must schedule both tasks and their offloads to Xeon Phi devices within the node.

Urgency of a task or offload is based on its slack, which is defined as the difference between the deadline and the expected completion time. Only pending tasks have slacks and urgencies. For a pending task $t_{ij}$, the slack is:

$$slack_{ij} = d_{ij} - p_{ij}$$

Once a task is scheduled, its offloads can have slacks and urgencies. For the k'th offload $o_{ijk}$ of task $t_{ij}$, the slack is:

$$slack_{ijk} = d_{ijk} - p_{ijk}$$

where $d_{ijk}$ is the deadline of offload $o_{ijk}$, and $p_{ijk}$ is the expected processing time of offload.

The urgency can be any appropriate function of the slack that increases as the slack decreases. In one embodiment, Urgency=$-1*$slack. In another embodiment, two functions used are:

$$Urgency = 1/MAX(slack,0)$$

$$Urgency = c1 * e^{-c2*slack}$$

where c1 and c2 are constants derived empirically.

The node scheduler measures the execution time of each offload of every task and maintains them in a history table. To predict the processing time of the next offload of a task, a history-based method examines that the previous H offloads, where H is a configuration parameter specified by the cluster administrator. At the beginning when no historical information is available for a task, the offload's predicted processing time defaults to the task's processing time specified by the user. If the history has fewer than H entries, all available entries are used.

The current method uses simple linear interpolation of the task's previous offloads' measured times in order to predict the processing time of the task's next offload. The predicted processing time of $o_{ijk}$, the k'th offload of task $t_{ij}$, is given by:

$$Tpred_{ijk} = F(p_{ij(k-H)}, p_{ij(k-H-1)}, \ldots p_{ij(k-1)})$$

where $p_{ij(k-H)}$ represents the actual, measured processing time of the k-H'th offload of task $t_{ij}$. F can simply average the last H measured offload processing times. Other forms of F such as weighted averaging and different extrapolation functions are possible as well.

In order to estimate a deadline for an offload, the system predicts the number of remaining offloads of a task and breakdown the user-provided task deadline uniformly into deadlines for each future offload. The number of remaining offloads is estimated using the user-provided task processing time $p_{ij}$, the time for which the task has run so far, and the predicted time of the next offload. Specifically, after offload k, the predicted number of remaining offloads for task $t_{ij}$, $Npred_{ij}$, is the difference between the user-provided processing time for the task and the measured execution time of the task so far, divided by the predicted time for the next offload:

$$Npred_{ij} = (p_{ij} - \text{execution time of } t_{ij} \text{ so far})/Tpred_{ijk}$$

With the number of remaining offloads, the deadline for the next offload, $o_{ijk}$, is follows:

$$d_{ijk} = \text{current time} + (d_{ij} - \text{current time})/Npred_{ij}$$

| ADVANTAGE | MECHANISM | POLICY |
|---|---|---|
| Avoiding memory oversubscription | Processes and offloads specify memory requirement through QoS. Invention uses memory containers to enforce limit for processes. | Memory factor $M_0$ (1 or larger): the fit function considers $M_0*$physical memory as the total physical memory of the coprocessor. If $M_0>1$, memory is oversubscribed in a measured way to leverage the fact that not all processes will require their maximum requested memory at the same time. |
| Avoiding thread oversubscription | Processes and offloads specify thread requirement through QoS. Invention schedules pocesses and offloads to control thread oversubscription. | Thread factor $T_0$ (1 or larger): the fit function considers $T_0*$hardware threads as the total number of threads in a coprocessor. If $T_0>1$, the number of threads is oversubscribed in a measured way to leverage the fact that slight oversubscriptions may actually be beneficial since otherwise offloads may have to wait longer. |

-continued

| ADVANTAGE | MECHANISM | POLICY |
|---|---|---|
| Guarantee fairness | If it cannot be dispatched, a process and offload is aged every scheduling cycle. | If the age reaches a configurable threshold, all scheduling is blocked until the aged process or offload is successfully scheduled. |
| Respect priority | Allow processes and offloads to specify priority through QoS. | Incorporate priority in urgency function that decides which process or offload must be scheduled next. |
| Achieving QoS | List scheduling. Penalize processes or offloads that under-request time on resources. | Use urgency = f(age, priority, waiting time, QoS, credits) to ensure processes or offloads that have been waiting long to be preferentially scheduled. |

The key components that enable the above advantages in the above table are:
  Simultaneous scheduling of processes and offloads
  Assignment of credits to processes based on runtime behavior of their offloads
  Assignment of ages to processes and offloads based on how many times they have been attempted to be scheduled
  Assignment of urgencies to processes and offloads based on priorities, waiting times, ages, requested QoS and credits.
  Scheduling based on urgencies.

An aging-based first-fit procedure for process selection is shown in FIG. 5C. At the start of a scheduling cycle, let P be the process at the head of the pending process queue. The scheduler maintains a circular list of the Xeon Phi coprocessors in the system. Let D be the next coprocessor in the list. The scheduler checks to see if the memory required by P fits in the available memory of D. If it does, P is removed from the queue and dispatched to D. If not, the next coprocessor in the circular list is examined. If P does not fit in any coprocessor, its age is incremented, and the next pending process is examined When a process' age reaches a threshold, all scheduling is blocked until that process is scheduled. This ensures fairness since all processes will get a chance at being scheduled.

Scheduling an offload is similar to scheduling a process, with one difference. Instead of memory, an offload has a thread requirement; COSMIC checks if the threads requested by an offload are available on the coprocessor on which the offload's owner process has been scheduled. If so, the offload is dispatched. If not, it increments the offload's age, and examines the next offload in the queue.

An administrator can specific the following parameters to tailor the scheduler's behavior: (i) aging threshold, (ii) thread over-scheduling factor and (iii) memory over-scheduling factor. The latter two indicate to what extent threads and memory may be oversubscribed.

The scheduling method thus enables:
  Simultaneous scheduling of processes and offloads
  Assigning credits to a process based on how well its offloads adhere to the requested time (QoS) on their resources
  Using credits to prioritize a process
  Using credits against a user's account
  Assigning an urgency to a process an offload, where the urgency is a function of the process' or offload's age, priority, arrival time, credits and QoS
  Using urgency to prioritize a process or offload
  Aging a process and its offload
  Blocking scheduling depending on age
  Allowing controlled memory and thread oversubscription using a configuration parameter.

COSMIC can be optionally configured to terminate any running process that uses more Xeon Phi memory than the amount specified by the user. COSMIC relies on Linux's memory resource controller to set up a memory container for each offload process on a Xeon Phi device. Each container limits the real committed memory usage of the offload process to the user-specified maximum value. If a process's memory footprint goes over the limit, the memory resource controller invokes Linux's out-of-memory killer (oom-killer) to terminate the offending process.

Enforcing this maximum memory usage rule requires an extra installation procedure and incurs minor runtime performance overhead. The memory resource controller is not enabled in the default Xeon Phi OS kernel. To install a new kernel with the memory resource controller requires adding one line to the kernel configuration file, recompiling the kernel, and rebooting Xeon Phi cards with the new kernel image. The runtime performance overhead due to using the Linux memory controller ranges from negligible to about 5% in real applications.

The scheduler in the framework allows multi-tasking where several tasks coexist and share each coprocessor. The cluster-level portion and a node-level portion handle the following:
  Accept/Reject Query Phase: When a task with a deadline and resource requirements arrives at the cluster, the cluster scheduler send the task requirements to each node and queries if the node can accept the task. Nodes reject tasks if they do not have sufficient resources, but otherwise indicate they can accept the task with an estimated completion time and confidence level. The cluster scheduler then issues the task to a suitable node, or rejects the task if resources are insufficient or if it cannot complete the task within its deadline due to system load. When tasks are rejected due to system load, the framework provides the user with a more feasible deadline for possible resubmission.
  Urgency-based Scheduling: The node-level scheduler schedules tasks and their offloads using a novel aging and urgency-based heuristic. Aging guarantees fairness, while urgency, which depends on deadlines and processing times, attempts to prioritize tasks and offloads so that maximal deadlines are met. Given a task deadline and processing time, the scheduler uses simple methods to estimate deadlines and processing times of subtasks offloaded to the Xeon Phi. It allows different tasks and their offloads to coexist on a Xeon Phi device while providing performance isolation and resource guarantees.
  Credits: The node-level scheduler uses a system of credits to relax the accuracy with which a user has to specify task processing times. A user accumulates credits if his or her tasks complete and free up resources faster than their requested processing times. Otherwise if tasks overrun their processing times, the user loses credits. A user can use credits gained from a fast task to offset a slow task. This allows some leeway in the specification of task processing times, which are often data dependent and not easy to specify accurately. Credits also help shift focus from the task-level to the user-level: the important thing is not how well every single task adheres to its processing times, but rather how well a group of tasks belonging to a user together adhere to their collective processing time estimates.

An exemplary many integrated cores (MIC) co-processor is discussed next. The cores, PCIe Interface logic, and GDDR5 memory controllers are connected via an Interprocessor Network (IPN) ring, which can be thought of as independent bidirectional ring. The L2 caches are shown as slices per core, but can also be thought of as a fully coherent cache, with a total size equal to the sum of the slices. Information can be copied to each core that uses it to provide the fastest possible local access, or a single copy can be present for all cores to provide maximum cache capacity. In one embodiment, the co-processor is the Intel® Xeon Phi™ coprocessor that can support up to 61 cores (making a 31 MB L2) cache) and 8 memory controllers with 2 GDDR5 channels each. Communication around the ring follows a Shortest Distance Algorithm (SDA). Co-resident with each core structure is a portion of a distributed tag directory. These tags are hashed to distribute workloads across the enabled cores. Physical addresses are also hashed to distribute memory accesses across the memory controllers. Each Xeon Phi core is dual-issue in-order, and includes 16 32-bit vector lanes. The performance of each core on sequential code is considerably slower than its multi-core counterpart. However, each core supports 4 hardware threads, resulting in good aggregate performance for highly parallelized and vectorized kernels. This makes the offload model, where sequential code runs on the host processor and parallelizable kernels are offloaded to the Xeon Phi, a suitable programming model. The Xeon Phi software stack consists of a host portion and coprocessor portion. The host portion asynchronous execution and data transfer between the host and Xeon Phi. The coprocessor portion of the software stack consists of a modified Linux kernel, drivers and the standard Linux proc file system that can be used to query device state (for example, the load average). The coprocessor portion also has a SCIF driver to communicate over the PCI bus with the host and other nodes. Together the current Xeon Phi software stack is referred to as the Many Integrated Core (MIC) Platform Software Stack or MPSS for short.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for scheduling workload in a system with a server node and one or more manycore coprocessors, comprising:
    receiving requests from processes or offloads to the coprocessors, each process or offload requesting a predetermined quality of service (QoS) including a request for memory and threads for a specified duration;
    determining a fit function, which determines the eligibility of a process or offload if one of the coprocessors has sufficient memory to satisfy a process' QoS and sufficient memory and threads to satisfy an offload's QoS, wherein the fit function first checks a memory resource fit for a process list and second, for each coprocessor, checks a thread resource fit;
    determining confidence of node n for estimating the completion time of task tij by:

$$\mathrm{conf}_{ij}{}^n = 1/(1+\text{number of pending tasks on } n + \text{number of executing tasks on } n);$$

determining an urgency function for scheduling an offload or a process based on priority, age, arrival time, credit and quality of service, wherein the urgency is calculated by:

$$\text{Urgency} = c1 * e^{-c2 * slack}$$

where c1 and c2 are constants and slack is a difference between a deadline and expected completion time;
    selecting a process from a process list and an offload from an offload list based on the fit function and the urgency function.

2. The method of claim 1, comprising simultaneous scheduling processes and offloads.

3. The method of claim 1, comprising deducting credits associated with a process if the process overruns resource consumption and otherwise adding credits to the process if the process uses less resources than planned.

4. The method of claim 1, comprising using credits to prioritize a process or to relax the accuracy with which a user has to specify task processing times.

5. The method of claim 1, wherein the urgency function is determined based on the process or offload's priority, age, waiting time, QoS and credit for freeing resource(s) ahead of requested processing time for each resource.

6. The method of claim 1, comprising assigning an urgency to a process an offload, where the urgency is a function of age, priority, arrival time, credits and QoS of a process or an offload.

7. The method of claim 1, comprising using urgency to prioritize a process or offload, wherein the urgency depends on deadlines and processing times and is used to prioritize tasks and offloads so that maximal deadlines are met.

8. The method of claim 1, comprising aging a process and offload.

9. The method of claim 1, comprising blocking scheduling depending on age.

10. The method of claim 1, comprising allowing controlled memory and thread oversubscription using a configuration parameter.

11. A method to manage a multi-server cluster with each server containing one or more coprocessors, comprising:

managing real-time bag-of-tasks applications for a cluster, wherein each task runs on a single server node, and uses the offload programming model, and wherein each task has a deadline and three specific resource requirements: total processing time, a certain number of manycore devices and peak memory on each device;

when a new task arrives, querying each node scheduler to determine which node can best accept the task and each node scheduler responds with an estimated completion time and a confidence level, wherein the node schedulers use an urgency-based heuristic to schedule each task and its offloads;

responding to an accept/reject query phase, wherein the cluster scheduler send the task requirements to each node and queries if the node can accept the task with an estimated completion time and confidence level; and scheduling tasks and offloads using an aging and urgency-based heuristic, wherein the aging guarantees fairness with a fit function that checks a memory resource fit for a process list and then for each coprocessor checks a thread resource fit, and the urgency prioritizes tasks and offloads so that maximal deadlines are met based on priority, age, arrival time, credit and quality of service and determining confidence of node n for estimating the completion time of task tij by:

$$\mathrm{conf}_{ij}^n = 1/(1 + \text{number of pending tasks on } n + \text{number of executing tasks on } n);$$

Urgency is calculated by:

$$\text{Urgency} = c1 * e^{c2 * slack}$$

where $c1$ and $c2$ are constants and slack is a difference between a deadline and expected completion time.

12. The method of claim 11, comprising applying an aging-based first-fit for process and offload scheduling.

13. The method of claim 11, comprising applying thread and memory over-scheduling factors to enhance performance.

14. The method of claim 11, comprising applying greedy core selection such that offloads from the same process get preference to use the same cores.

* * * * *